(12) United States Patent
Chaudhary et al.

(10) Patent No.: US 9,422,418 B2
(45) Date of Patent: Aug. 23, 2016

(54) ACETYLATED MONOGLYCERIDE OF 12-HYDROXYSTEARIC ACID AND BLENDS WITH EPOXIDIZED FATTY ACID ESTERS

(75) Inventors: Bharat I. Chaudhary, Princeton, NJ (US); Klaus Schiller, Halle (DE); Michael Meerbote, Gutenberg (DE)

(73) Assignee: Dow Global Technologies LLC, Midland, MI (US)

( * ) Notice: Subject to any disclaimer, the term of this patent is extended or adjusted under 35 U.S.C. 154(b) by 308 days.

(21) Appl. No.: 13/498,759

(22) PCT Filed: Sep. 29, 2010

(86) PCT No.: PCT/US2010/050690
§ 371 (c)(1),
(2), (4) Date: Jul. 16, 2012

(87) PCT Pub. No.: WO2011/041388
PCT Pub. Date: Apr. 7, 2011

(65) Prior Publication Data
US 2012/0276398 A1  Nov. 1, 2012

Related U.S. Application Data

(60) Provisional application No. 61/247,427, filed on Sep. 30, 2009, provisional application No. 61/288,713, filed on Dec. 21, 2009.

(51) Int. Cl.
*C08K 5/1515* (2006.01)
*H01B 3/44* (2006.01)
*C08K 5/103* (2006.01)

(52) U.S. Cl.
CPC .............. *C08K 5/103* (2013.01); *C08K 5/1515* (2013.01); *H01B 3/443* (2013.01); *Y10T 428/31699* (2015.04)

(58) Field of Classification Search
CPC ................. C08K 5/103; C08K 5/1515; Y10T 428/31699; H01B 3/443
See application file for complete search history.

(56) References Cited

U.S. PATENT DOCUMENTS

| | | | |
|---|---|---|---|
| 2,397,592 | A | 4/1946 | Blades |
| 2,403,215 | A | 7/1946 | Foster |
| 2,458,484 | A | 1/1949 | Terry et al. |
| 2,500,918 | A | 3/1950 | Rueter et al. |
| 2,618,622 | A | 11/1952 | Grummit et al. |
| 2,666,752 | A | 1/1954 | Grummit et al. |

(Continued)

FOREIGN PATENT DOCUMENTS

| | | |
|---|---|---|
| CA | 1188445 | 9/2010 |
| CN | 1341681 | 3/2002 |

(Continued)

OTHER PUBLICATIONS

Machine translation of JP 2006-282999.

(Continued)

*Primary Examiner* — Kevin R Kruer
(74) *Attorney, Agent, or Firm* — Whyte Hirschboeck Dudek S.C.

(57) ABSTRACT

The present disclosure is directed to plasticizer compositions. A composition is provided which includes a castor-free acetylated glyceride of 12-hydroxystearic acid (AGHA) having a hydroxyl number from 0 to less than 15. The castor-free AGHA finds application in coatings for wire and cable.

19 Claims, 6 Drawing Sheets

(56) References Cited

U.S. PATENT DOCUMENTS

| | | | |
|---|---|---|---|
| 3,138,566 A | 6/1964 | Arnold | |
| 3,384,608 A * | 5/1968 | Hardy et al. | 524/153 |
| 3,409,580 A | 11/1968 | Alzner et al. | |
| 3,639,318 A | 2/1972 | Tijunelis et al. | |
| 3,650,775 A * | 3/1972 | Simon | B31B 23/00 206/484.1 |
| 3,668,091 A | 6/1972 | French et al. | |
| 3,712,875 A | 1/1973 | Tijunelis | |
| 3,778,465 A | 12/1973 | Branstorf | |
| 3,780,140 A | 12/1973 | Hammer | |
| 3,868,341 A | 2/1975 | Sauer et al. | |
| 3,872,187 A | 3/1975 | Fath | |
| 3,891,694 A | 6/1975 | Mills et al. | |
| 4,026,852 A * | 5/1977 | White | C08K 13/02 524/180 |
| 4,083,816 A | 4/1978 | Frankel et al. | |
| 4,346,145 A | 8/1982 | Choi et al. | |
| 4,421,886 A | 12/1983 | Worschech et al. | |
| 4,426,477 A | 1/1984 | Yasumatsu et al. | |
| 4,556,694 A | 12/1985 | Wallace | |
| 4,605,694 A | 8/1986 | Walker | |
| 4,612,192 A | 9/1986 | Scheuffgen et al. | |
| 4,613,533 A | 9/1986 | Loomis et al. | |
| 4,627,993 A | 12/1986 | Loomis | |
| 4,670,494 A | 6/1987 | Semenza, Jr. | |
| 4,857,600 A | 8/1989 | Gross et al. | |
| 5,225,108 A | 7/1993 | Bae et al. | |
| 5,227,417 A | 7/1993 | Kroushl | |
| 5,246,783 A | 9/1993 | Spenadel et al. | |
| 5,270,366 A | 12/1993 | Hein | |
| 5,278,236 A | 1/1994 | Case et al. | |
| 5,430,108 A | 7/1995 | Schlosberg et al. | |
| 5,454,806 A | 10/1995 | Shinonome | |
| 5,464,903 A | 11/1995 | Hofman | |
| 5,466,267 A | 11/1995 | Baillargeon et al. | |
| 5,495,033 A | 2/1996 | Basu et al. | |
| 5,575,965 A | 11/1996 | Caronia et al. | |
| 5,736,605 A | 4/1998 | Oshima | |
| 5,756,570 A | 5/1998 | Hoch et al. | |
| 5,886,072 A | 3/1999 | Linsky et al. | |
| 6,063,846 A * | 5/2000 | Weng et al. | 524/296 |
| 6,114,425 A | 9/2000 | Day et al. | |
| 6,274,750 B1 | 8/2001 | Sato et al. | |
| 6,417,260 B1 | 7/2002 | Weng et al. | |
| 6,437,170 B1 | 8/2002 | Thil et al. | |
| 6,451,958 B1 | 9/2002 | Fan et al. | |
| 6,496,629 B2 | 12/2002 | Ma et al. | |
| 6,608,142 B1 | 8/2003 | Weng et al. | |
| 6,706,815 B2 | 3/2004 | Marchand et al. | |
| 6,714,707 B2 | 3/2004 | Rossi et al. | |
| 6,734,241 B1 | 5/2004 | Nielsen et al. | |
| 6,797,753 B2 | 9/2004 | Benecke et al. | |
| 6,849,694 B2 | 2/2005 | Hata | |
| 6,949,597 B2 | 9/2005 | Nielsen et al. | |
| 7,700,675 B2 | 4/2010 | Bueno de Almeida et al. | |
| 2002/0013396 A1 | 1/2002 | Benecke et al. | |
| 2004/0122159 A1 | 6/2004 | Mhetor et al. | |
| 2005/0090590 A1 | 4/2005 | Nielsen et al. | |
| 2005/0203230 A1 | 9/2005 | Kadakia et al. | |
| 2006/0025544 A1 | 2/2006 | Koube et al. | |
| 2006/0276575 A1 | 12/2006 | Hamaguchi et al. | |
| 2007/0100049 A1 | 5/2007 | Ishizuka | |
| 2007/0135562 A1 | 6/2007 | Freese et al. | |
| 2008/0200595 A1 | 8/2008 | Hinault et al. | |
| 2008/0227993 A1 | 9/2008 | Zuckerman | |
| 2009/0149585 A1 | 6/2009 | DeQuadros Junior et al. | |
| 2009/0149586 A1 | 6/2009 | DeQuadros Junior et al. | |
| 2009/0312478 A1 | 12/2009 | Hasegawa et al. | |
| 2010/0010127 A1 | 1/2010 | Barki et al. | |
| 2010/0256278 A1 | 10/2010 | Harada et al. | |
| 2011/0076502 A1 | 3/2011 | Chaudhary et al. | |
| 2011/0272174 A1 | 11/2011 | Chaudhary et al. | |
| 2013/0005937 A1 | 1/2013 | Cramail et al. | |

FOREIGN PATENT DOCUMENTS

| | | |
|---|---|---|
| CN | 101070510 | 11/2007 |
| CN | 101108982 | 1/2008 |
| CN | 101591588 | 12/2009 |
| CN | 101914219 | 12/2010 |
| EP | 1437722 | 5/1966 |
| EP | 0192961 A1 | 9/1986 |
| EP | 0358179 A2 | 3/1990 |
| EP | 0364717 A1 | 4/1990 |
| EP | 0393813 A1 | 10/1990 |
| EP | 0473915 A1 | 3/1992 |
| EP | 0565984 A1 | 10/1993 |
| EP | 1218443 | 3/2001 |
| EP | 1361039 | 11/2003 |
| EP | 0986606 B1 | 8/2004 |
| EP | 1624014 | 2/2006 |
| EP | 1624014 | 8/2006 |
| EP | 2070977 A2 | 6/2009 |
| EP | 2245089 A1 | 5/2012 |
| GA | 2155021 | 9/1985 |
| GB | 499931 | 1/1939 |
| GB | 790314 | 2/1958 |
| GB | 910543 | 11/1962 |
| GB | 934689 | 8/1963 |
| GB | 1022920 | 3/1966 |
| GB | 1102506 | 2/1968 |
| GB | 1300526 | 12/1972 |
| GB | 1341623 | 12/1973 |
| GB | 1415770 | 11/1975 |
| JP | S61-016950 | 1/1986 |
| JP | 04-059851 | 2/1992 |
| JP | H04-085354 | 3/1992 |
| JP | H04-261452 | 9/1992 |
| JP | 2000-319468 | 11/2000 |
| JP | 2003-064233 | 3/2003 |
| JP | 2003-297149 | 10/2003 |
| JP | 2004-311064 | 11/2004 |
| JP | 2006-282999 A | 10/2006 |
| JP | 2010-042669 | 2/2010 |
| VN | 9730115 | 8/1997 |
| WO | 0114466 | 3/2001 |
| WO | 01/98404 | 12/2001 |
| WO | 2004/052997 A1 | 6/2004 |
| WO | 2007/006489 | 1/2007 |
| WO | 2008/081330 | 7/2008 |
| WO | 2008081332 | 7/2008 |
| WO | 2008/122364 A1 | 10/2008 |
| WO | 2009/102877 | 8/2009 |
| WO | 2011/041372 | 4/2011 |
| WO | 2011/041380 | 4/2011 |
| WO | 2011/041388 | 4/2011 |
| WO | 2013/003225 A2 | 1/2013 |

OTHER PUBLICATIONS

International Search Report mailed Aug. 2, 2011 for PCT App. No. PCT/US2010/050690.
Vertellus Performance Materials Inc.; Flexricin P-8 Technical Data Sheet, Nov. 2006.
Grummitt et al., Acetylated Castor Oil Industrial and Engineering Chemistry, vol. 37, No. 5, May 1945, pp. 485-491.
Orellana-Coca et al., Journal of Molecular Catalysis B: Enzymatic 44 (2007) 133-137.
Du et al., JAOCS, vol. 81, No. 4 (2004) 477-480.
Sheehan et al, A Look Back at the U.S. Department of Energy's Aquatic Species Program: Biodiesel from Algae, National Renewable Energy Laboratory, Colorado, Jul. 1998, pp. 1-294.
Greenspan et al., Industrial and Engineering Chemistry, 445(12), 1953, pp. 2722-2726.
Thomson Scientific, Mar. 13, 2009, London, GB.
Greenspan et al., The Journal of the American Oil Chemists Society, 33, 1956, pp. 391-394.
Gan et al., European Polymer Journal, 31(8), 1994, pp. 719-724.
Rehberg et al., Ind. Eng. Chem., 44(9) 1952, pp. 2191-2195.
Taylor, Proceedings of the World Conference on Oilseed Technology and Utilization, American Oil Chemists Society, Champaign, 1992, pp. 152-165.

(56) References Cited

OTHER PUBLICATIONS

Tekin et al., JAOCS, 77(3), 2000, pp. 281-283.
Cai et al., Eur. J. Lipid Sci., Technol., 2008, 110, pp. 341-346.
Campanella et al., Chemical Engineering Journal, 144 (2008), pp. 466-475.
Santacesara et al, Chemical Engineering Journal, vol. 173, Issue 1, Sep. 1, 2011, pp. 198-209.
Senzana et al, Journal of the Americal Oil Chemists Society, vol. 78, No. 7 (2001), pp. 725-731.
Haas, Fuel Processing Technology 86, 2005, pp. 1087-1096.
Grindsted Soft-N-Safe brochure, Danisco (date unknown).
International Search Report mailed Feb. 8, 2011 for PCT App. No. PCT/US2010/050690.
International Search Report and Written Opinion of PCT/US2009/033935 dated May 18, 2009.
Nternational Preliminary Report on Patentability of PCT/US2009/033935 dated Aug. 26, 2010.
International Search Report and Written Opinion of PCT/US2010/050654 dated Nov. 9, 2010.
International Search Report and Written Opinion of PCT/US2010/050676 dated Jan. 12, 2011.
International Preliminary Report on Patentability of PCT/US2011/041557 dated Aug. 31, 2012.
International Search Report and Written Opinion of PCT/US2011/041557 dated Sep. 5, 2011.
International Preliminary Report on Patentability of PCT/US2011/050690 dated Jan. 12, 2012.
International Search Report and Written Opinion of PCT/US2011/045653 dated Oct. 7, 2011.
International Search Report and Written Opinion of PCT/US2012/043740 dated Jan. 23, 2013.
International Search Report and Written Opinion of PCT/US2012/055070 dated Dec. 3, 2012.
International Search Report and Written Opinion of PCT/US2013/023362 dated Mar. 28, 2013.
International Search Report and Written Opinion of PCT/US2010/050699 dated Nov. 8, 2010.
International Search Report and Written Opinion of PCT/US2011/035143 dated Aug. 26, 2011.
http://hebjingu.en.alibaba.com; retrieved Jun. 13, 2013; cited by applicant.
http://en.wikipedia.org/wiki/Chlorine ; retrieved Jun. 13, 2013; cited by applicant.
http://en.wikipedia.org/wiki/Bleaching_of_wood_pulp retrieved Jun. 13, 2013; cited by applicant.
TIC America, Online catalog: Tributrin; http://web.archive.org/web/20080511154307/http://www.tciamerica.com/retrieved Jun. 13, 2013; cited by applicant.
Opposition filed against EP2245089 dated Jan. 9, 2013.
Morgenstern, B., Epoxidized Fatty Acid Esters as Plasticizers for PVC dated Apr. 22, 2005.
Morgenstern, B., Use of Modified Fatty Acid Esters as Plasticizers for PVC dated Sep. 12, 2003.
Morgenstern, B., Epoxidized Fatty Acid Esters as Plasticizers for PVC, presented at the 7th Freiberg Polymer Conference, Apr. 21 and 22, 2005.
Freedman et al., JAOCS, 63(10), 1986, pp. 1375-1380.

* cited by examiner

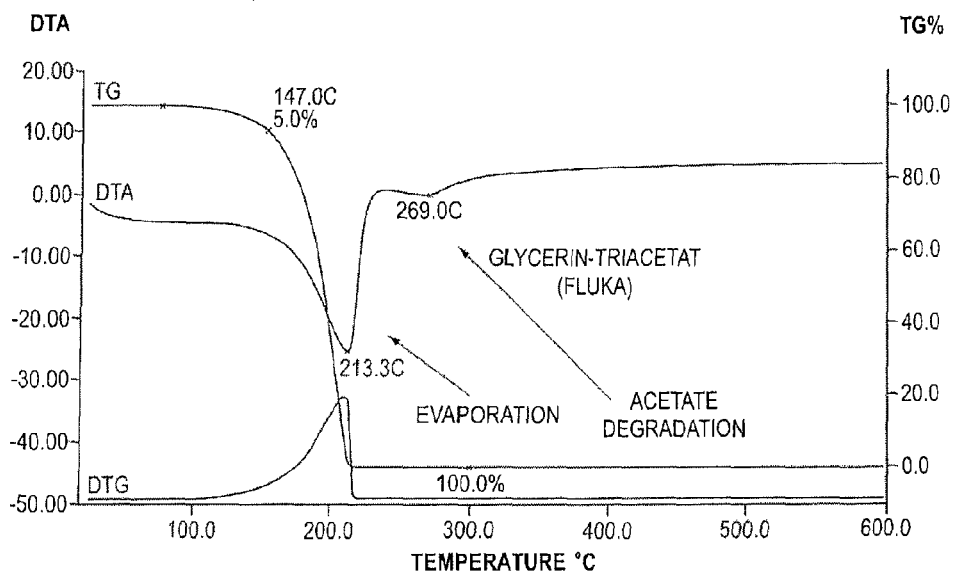
Fig. 1: TG/DTA THERMOGRAM OF GLYCERIN TRIACETATE (FLUKA) TG, DTA, DTG CURVES FROM TOP TO BOTTOM
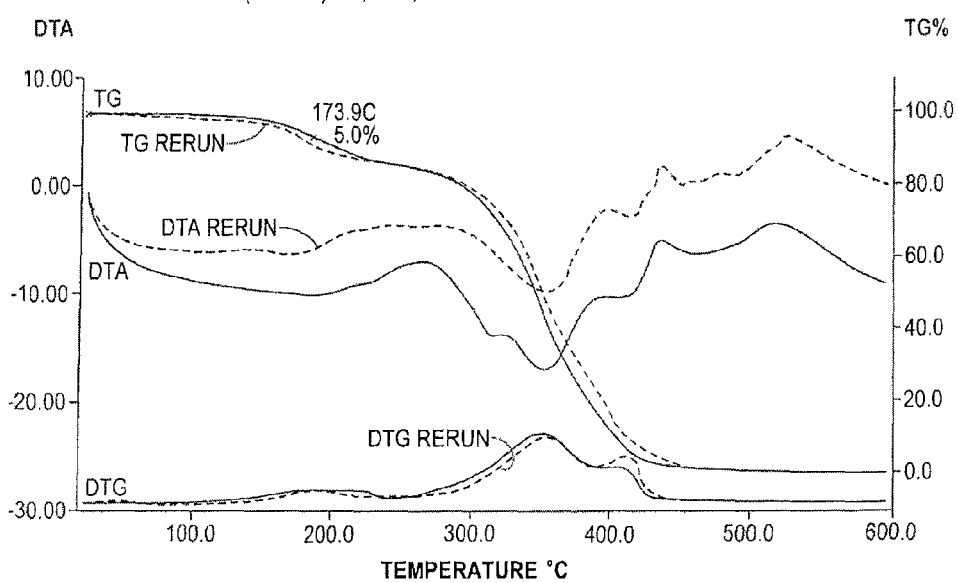
Fig. 2: TG/DTA THERMOGRAM OR TG THERMOGRAMS OF EXAMPLE 2, EXAMPLE 2 (RERUN) TG, DTA, DTG CURVES FROM TOP TO BOTTOM

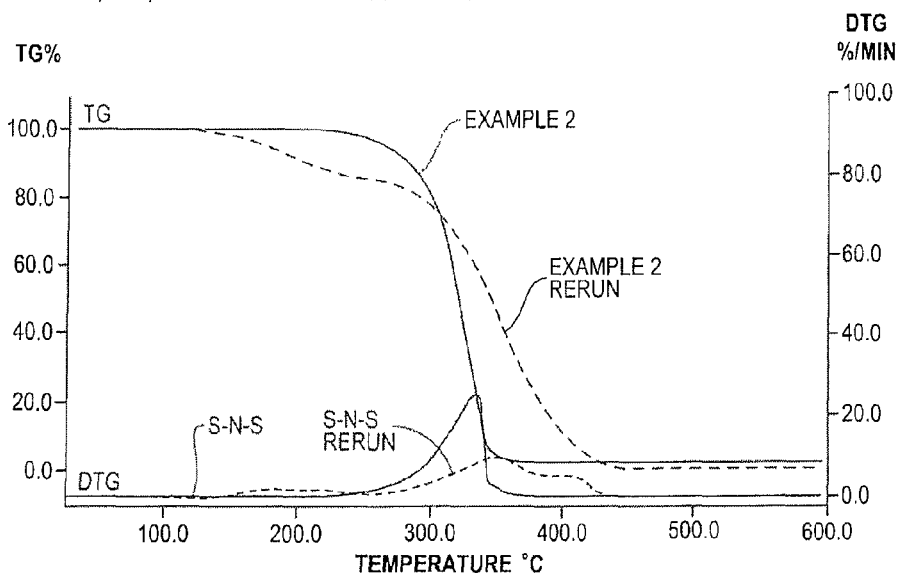
Fig. 3: TG/DTA THERMOGRAMS OF EXAMPLE 2 COMPARED TO GRINDSTED SOFT-N-SAFE - (DOTTED LINE: EXAMPLE 2(RERUN)) TG, DTA, DTG CURVES FROM TOP TO BOTTOM
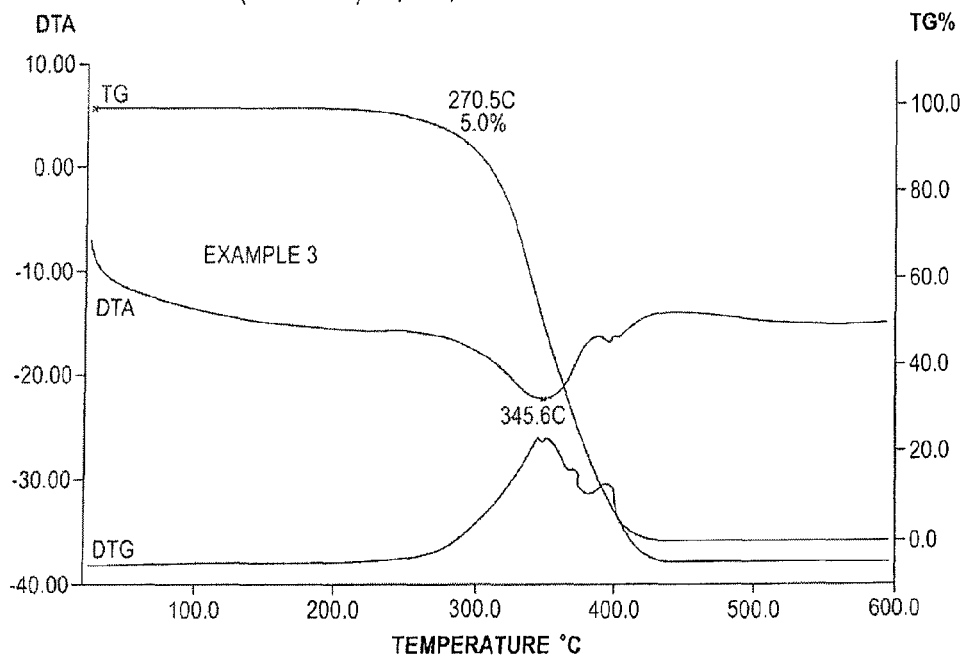
Fig. 4A: TG/DTA THERMOGRAMS OF EXAMPLE 3 (FIGURE 4A) AND EXAMPLE 4 (FIGURE 4B) TG, DTA, DTG CURVES FROM TOP TO BOTTOM

Fig. 5: SEC/RI OVERLAY CHROMATOGRAMS EXAMPLE 1 COMPARED TO RAW MATERIALS, INTERMEDIATES AND TRIACETIN
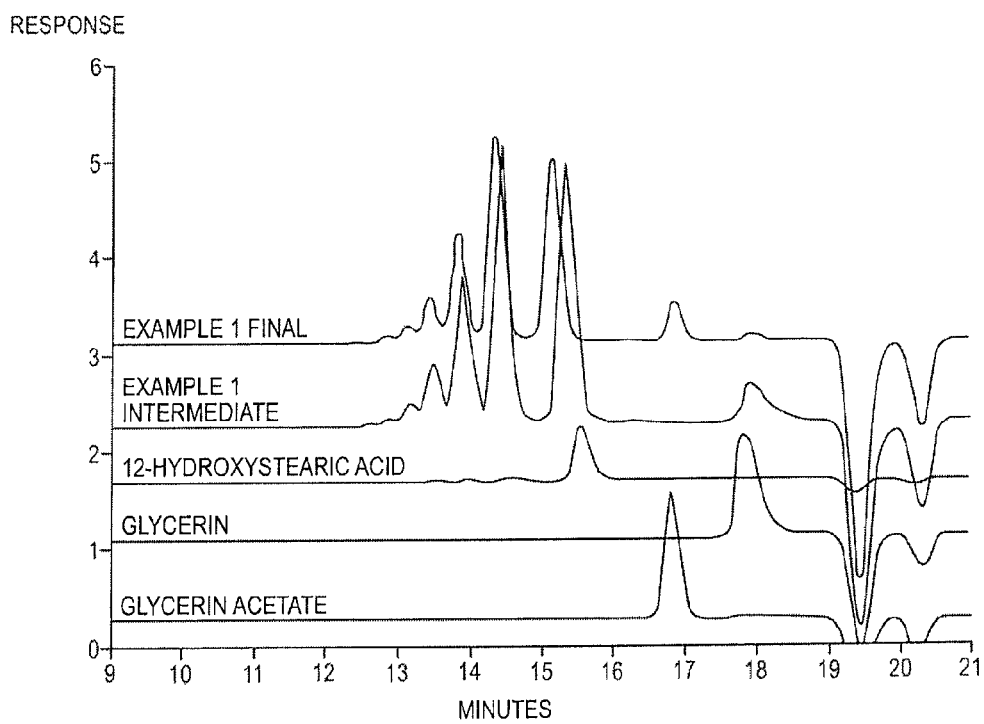
| COMPOSITION EXAMPLE 1 | |
|---|---|
| PEAK | PORTION |
| 13,15 MIN - PEAK 1 | 3,5% |
| 13,46 MIN - PEAK 2 | 6,9% |
| 13,86 MIN - PEAK 3 | 17,1% |
| 14,40 MIN - PEAK 4 | 33,0% |
| 15,31 MIN - PEAK 5 | 30,7% |
| 16,31 MIN - PEAK 6 | 0,6% |
| GLYCERIN | 8,1% |

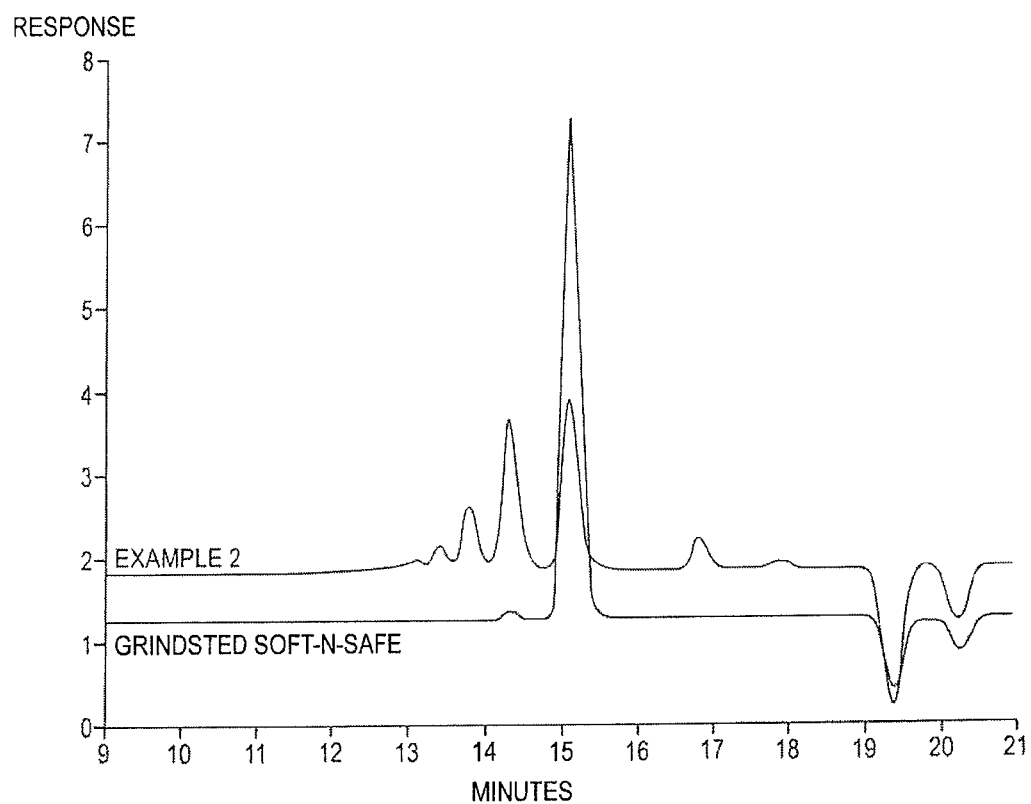
Fig. 6: SEC/RI OVERLAY CHROMATOGRAMS EXAMPLE 2 COMPARED TO GRINDSTED SOFT-N-SAFE®

Fig. 7: SEC/RI OVERLAY CHROMATOGRAMS - EXAMPLE 3 COMPARED TO RAW MATERIAL: 12-HYDROXY STEARIC ACID MONOGLYCERIDE
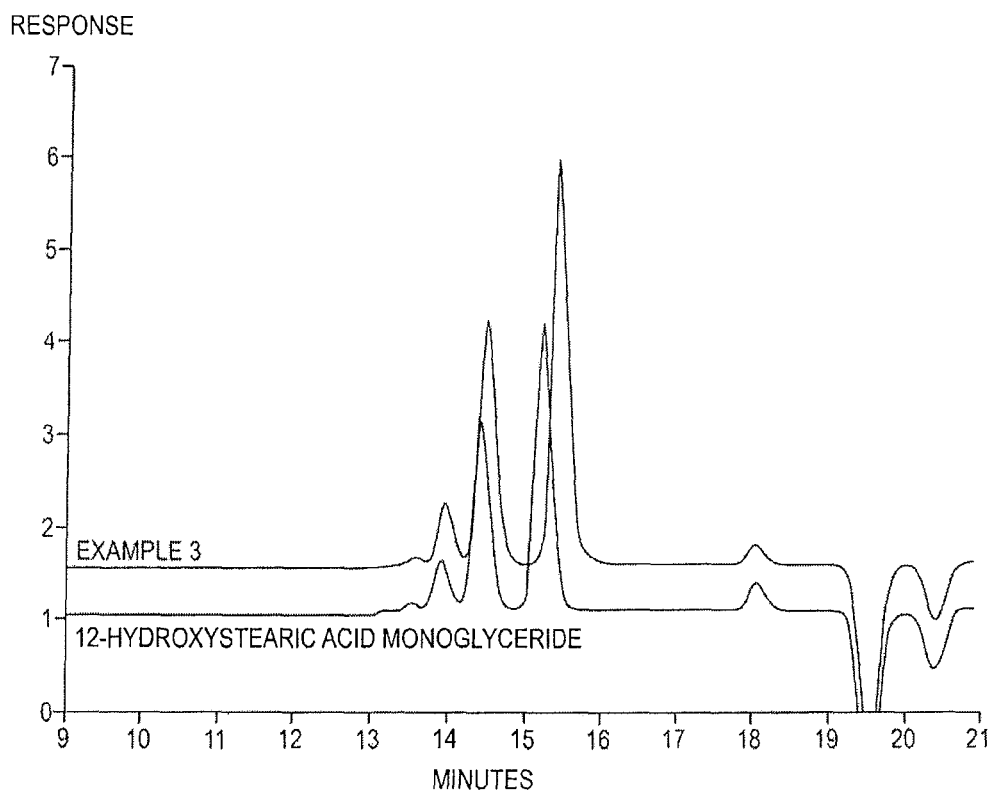
| COMPOSITION EA | | |
|---|---|---|
| PEAK (ELUTION TIME) | MP | AREA % |
| 1 (13,56 MINUTES) | 1310 | 1,64 |
| 2 (13,94 MINUTES) | 1040 | 9,48 |
| 3 (14,45 MINUTES) | 750 | 35,0 |
| 4 (15,26 MINUTES) | 450 | 52,1 |
| 5 (15,88 MINUTES) | 305 | 0,82 |
| 6 (16,99 MINUTES) | 150 | 0,60 |

ACETYLATED MONOGLYCERIDE OF 12-HYDROXYSTEARIC ACID AND BLENDS WITH EPOXIDIZED FATTY ACID ESTERS

PRIORITY

This application claims priority to U.S. Patent Application No. 61/247,427 filed on Sep. 30, 2009 and U.S. Patent Application No. 61/288,713 filed on Dec. 21, 2009. The entire content of each application is incorporated by reference herein.

BACKGROUND

Plasticizers are compounds or mixtures of compounds that are added to polymer resins to impart softness and flexibility. Phthalic acid diesters (also known as "phthalates") are known plasticizers in many flexible polymer products, such as polymer products formed from polyvinyl chloride (PVC) and other vinyl polymers. Examples of common phthalate plasticizers include di-isononyl phthalate (DINP), diallyl phthalate (DAP), di-2-ethylhexyl-phthalate (DEHP), dioctyl phthalate (DOP) and diisodecyl phthalate (DIDP). Other common plasticizers, used for high temperature applications, are trimellitates and adipic polyesters. Mixtures of plasticizers are often used to obtain optimum properties.

Phthalate plasticizers have recently come under intense scrutiny by public interest groups that are concerned about the negative environmental impact of phthalates and potential adverse health effects in humans (especially children) exposed to phthalates.

Consequently, a need exists for phthalate-free plasticizers for polymer resins. A need further exists for phthalate-free plasticized polymers that have the same, or substantially the same, chemical, mechanical, and/or physical properties as polymers containing phthalate plasticizers.

SUMMARY

The present disclosure is directed to phthalate-free plasticizers. The present compositions and plasticizers are particularly well-suited for high temperature (rated at greater than 60° C.) applications and high temperature wire and cable applications in particular.

The present disclosure provides a composition. In an embodiment, a composition is provided and includes a castor-free acetylated glyceride of 12-hydroxystearic acid (AGHA) having a hydroxyl number from 0 to less than 15 as measured in accordance with DIN 53240.

The present disclosure provides a polymeric composition. In an embodiment, a polymeric composition is provided and includes a polymeric resin a plasticizer composition. The plasticizer composition includes a castor-free AGHA and optionally other plasticizers including, but not limited to, an epoxidized fatty acid ester.

The present disclosure provides a coated conductor which includes a metal conductor and a coating on the metal conductor. The coating includes a polymeric resin and a plasticizer composition. The plasticizer composition includes an AGHA having a hydroxyl number from 0 to less than 15. The AGHA has a solution temperature ranging from about 160° C. to about 180° C. as measured in accordance with DIN 53 408. The AGHA may be a castor-free AGHA.

BRIEF DESCRIPTION OF THE DRAWINGS

FIG. 1 shows a thermogram of triacetin.
FIG. 2 shows TG/DTA thermograms for compositions in accordance with embodiments of the present disclosure.
FIG. 3 shows TG/DTA thermograms for compositions in accordance with an embodiment of the present disclosure.
FIGS. 4A-4B show TG/DTA thermograms for compositions in accordance with embodiments of the present disclosure
FIG. 5 shows SEC/RI overlay chromatograms for raw materials and compositions in accordance with embodiments of the present disclosure.
FIG. 6 shows SEC/RI overlay chromatograms for a comparative sample and a composition in accordance with an embodiment of the present disclosure.
FIG. 7 shows SEC/RI overlay chromatograms for a raw material and a composition in accordance with an embodiment of the present disclosure.

DETAILED DESCRIPTION

Figure 4B:
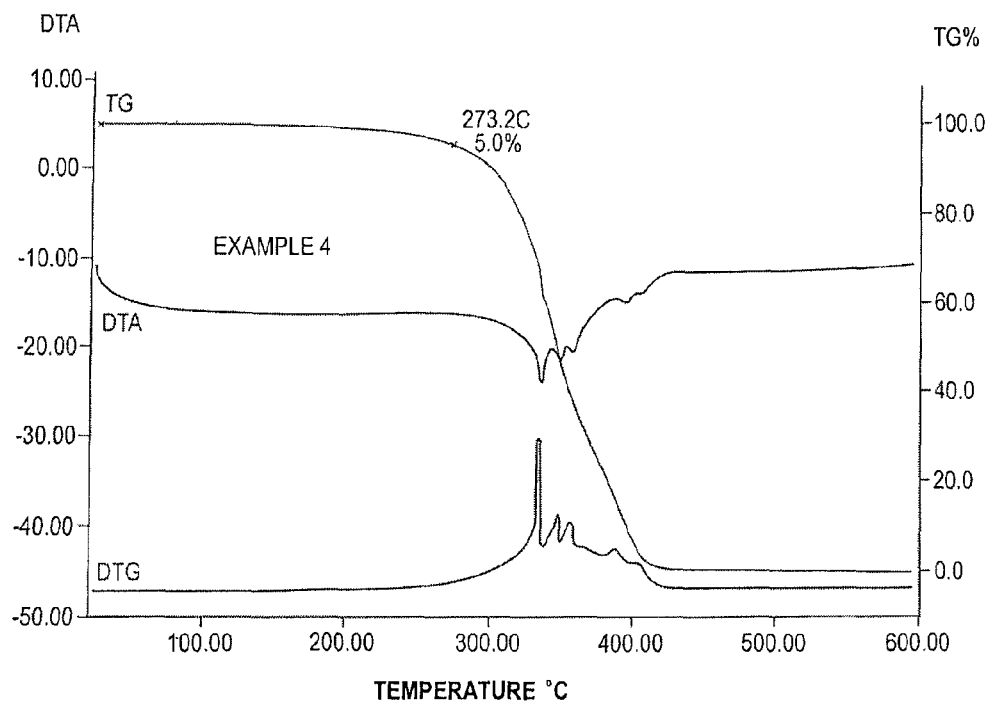

The present disclosure is directed to an acetylated glyceride of 12-hydroxystearic acid and compositions including the same. The compositions provided herein are suitable for use as plasticizers in polymer resins and vinyl chloride resins in particular, especially for wire and cable applications.

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent U.S. version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt index, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts for components in the composition and/or coating, additives, and various other components in the composition, and the various characteristics and properties by which these components are defined.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term, "atom" refers to the smallest constituent of an element regardless of ionic state, that is, whether or not the same bears a charge or partial charge or is bonded to another atom. The term "amorphous" refers to a polymer lacking a crystalline melting point as determined by differential scanning calorimetry (DSC) or equivalent technique.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

"Composition" and like terms mean a mixture or blend of two or more components.

"Blend," "polymer blend" and like terms mean a blend of two or more polymers, as well as blends of polymers with various additives. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "polymer" (and like terms) is a macromolecular compound prepared by reacting (i.e., polymerizing) monomers of the same or different type. "Polymer" includes homopolymers and copolymers.

In an embodiment, the compositions disclosed herein are phthalate-free. The term "phthalate-free composition," as used herein, is a composition devoid of phthalate or is otherwise free of phthalate. A "phthalate," is a compound which includes the following structure (I):

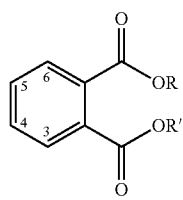

(I)

wherein R and R' may be the same or different. Each of R and R' is selected from a substituted-/unsubstituted-hydrocarbyl group having 1 to 20 carbon atoms. As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups. Each position 3, 4, 5, and 6 may be populated by hydrogen or other moiety.

In an embodiment, a composition is provided and includes an acetylated glyceride of 12-hydroxystearic acid (AGHA). An "acetylated glyceride of 12-hydroxystearic acid" is a mono-, di-, or tri-glyceride of 12-hydroxystearic acid in which one, some, all, or substantially all of the —OH groups are acetylated. For example, an "acetylated monoglyceride of 12-hydroxystearic acid," (or AMHA) as used herein, is represented by the following formula (II):

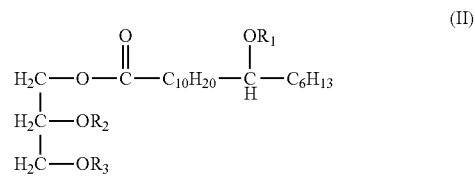

(II)

wherein $R_1$, $R_2$ and $R_3$ each individually represent an acetyl group or a hydrogen atom and at least one, or at least two, of the R group(s) is/are an acetyl group. In a further embodiment, each of $R_1$-$R_3$ is an acetyl group. The formula for acetylated diglyceride of 12-hydroxystearic acid (ADHA), and acetylated triglyceride of 12-hydroxystearic acid (ATHA) follow formula (II) with additional of 12-hydroxystearic acid moiety at $R_2$ and/or $R_3$. In an embodiment, the composition includes one or more of the following: acetylated monoglyceride of 12-hydroxystearic acid (AMHA), acetylated diglyceride of 12-hydroxystearic acid (ADHA), acetylated triglyceride of 12-hydroxystearic acid (ATHA), glycerol, triacetin (glycerin triacetate), and any combination thereof.

Some, substantially all, or all, of the —OH groups of the glyceride of 12-hydroxystearic acid may be acetylated. The total amount of the acetyl groups is in the range of 2.7 to 3.0 mol per mol of glycerin, or 2.9 to 3.0 mol per mol of glycerin. The acetylation results in an AGHA having a hydroxyl number from 0 to less than 100, or from 0 to less than 15, or from 0 to less than 10, or from 0 to less than 5, or from 0 to less than 2, or 0. The hydroxyl number is determined in accordance with DIN 53240.

The present AGHA is a castor-free AGHA. A "castor-free AGHA" is void, devoid, or otherwise free, or substantially free, of castor oil fatty acid glycerides and derivatives thereof, except for the mono-/di-/tri-glyceride(s) of 12-hydroxystearic acid as discussed above. "Castor oil fatty acid glycerides" include glycerides (derivatives thereof and acetylated derivatives thereof) with one or more of the following fatty acid moieties: ricinoleic acid, oleic acid, linoleic acid, linolenic acid, stearic acid, palmitic acid, eicosanoic acid, gadoleic acid, arachidic acid, and any combination of the foregoing. Conventional compositions containing acetylated monoglyceride of 12-hydroxystearic acid are made by interesterification between glycerol and castor oil (hardened or unhardened) followed by acetylation. Consequently, these conventional compositions contain one or more castor oil fatty acid (mono-/di-/tri-)glycerides in addition to acetylated monoglyceride of 12-hydroxystearic acid.

Applicants have surprisingly discovered that preparation of the present AGHA by way of (i) esterification of glycerine and 12-hydroxystearic acid followed by acetylation and/or (ii) acetylation of glyceryl 12-hydroxystearate (each preparation being void of castor oil) provides an AGHA containing no, or substantially no, castor oil fatty acid glycerides—i.e., a castor-free AGHA. The present castor-free AGHA exhibits unexpected properties and in particular unexpectedly strong performance for high temperature applications and high temperature (rated at greater than 60° C.) wire and cable applications.

The present disclosure provides a composition. In an embodiment, a composition is provided and includes a castor-free acetylated glyceride of 12-hydroxystearic acid (AGHA). The AGHA has a hydroxyl number from 0 to less from 15, or from 0 to less than 5 as measured in accordance with DIN 53240. The AGHA is prepared by acetylation of glyceryl mono-12-hydroxystearate and/or glyceryl di-12-hydroxystearate and/or glyceryl tri-12-hydroxystearate with acetic anhydride. Thus, no castor oil is used to prepare the castor-free AGHA. The composition optionally includes from 0.5 wt % to 30 wt % triacetin (glycerin triacetate). The AGHA is prepared by esterifying glycerol with 12-hydroxystearic acid (optionally in the presence of a catalyst) followed by acetylation with acetic anhydride.

In an embodiment, the composition is greater than 50 wt %, or greater than 70 wt %, or greater than 90 wt % AGHA.

In an embodiment, the composition is void of castor oil fatty acid glycerides. The composition is void of glycerides (derivatives thereof and acetylated derivatives thereof) with fatty acid moieties containing one or more of the following: ricinoleic acid, oleic acid, linoleic acid, linolenic acid, stearic acid, palmitic acid, eicosanoic acid, gadoleic acid, arachidic acid, and any combination of the foregoing.

In an embodiment, the composition has a solution temperature from about 140° C. to about 180° C., or from about 160° C. to about 180° C. as measured in accordance with DIN 53 408.

In an embodiment, the composition has a viscosity from 50 mPas to 300 mPas or from 100 mPas to 300 mPas at 25° C., as measured in accordance with ASTM D445 (Brookfield).

In an embodiment, the composition has a temperature of 5% mass loss from about 150° C. to about 300° C. or from about 150° C. to about 190° C.

In an embodiment, the composition has a mass loss at 136° C. from 0% to 15%, or from 0 to less than 0.5%.

In an embodiment, the composition has an APHA color from about 0 to about 3000, or from about 0 to about 1000, or from about 0 to about 500.

In an embodiment, the castor-free AGHA is prepared by esterifying glycerol with 12-hydroxystearic acid (optionally in the presence of a catalyst) followed by acetylation with acetic anhydride. In addition to the castor-free AGHA, the composition also includes 0.5 wt % to 30 wt % triacetin (glycerin triacetate). The composition has a solution temperature from about 140° C. to about 180° C. (or from about 160° C. to about 180° C.), a viscosity from about 50 mPas to about 300 mPas, a temperature of 5% mass loss from about 150° C. to about 300° C., and/or a mass loss at 136° C. from 0% to 15%.

In an embodiment, the composition is void of castor oil fatty acid glycerides. The composition is void of glycerides (derivatives thereof and acetylated derivatives thereof) with fatty acid moieties containing one or more of the following: ricinoleic acid, oleic acid, linoleic acid, linolenic acid, stearic acid, palmitic acid, eicosanoic acid, gadoleic acid, arachidic acid, and any combination of the foregoing.

In an embodiment, the composition has a solution temperature from about 140° C. to about 180° C., or from about 160° C. to about 180° C. as measured in accordance with DIN 53 408.

In an embodiment, the composition has a viscosity from 100 mPas to 300 mPas or from 100 mPas to 300 mPas at 25° C., as measured in accordance with ASTM D445 (Brookfield).

In an embodiment, the composition has a temperature of 5% mass loss from about 270° C. to about 300° C. or from about 270° C. to about 280° C.

In an embodiment, the composition has a mass loss at 136° C. less than about 0.5%, or from 0 to less than 0.5%.

In an embodiment, the composition has an APHA color from about 0 to about 3000, or from about 0 to about 1000, or from about 0 to about 500.

The compositions may comprise two or more embodiments disclosed herein.

The castor-free AGHA may contain an amount of insoluble component. The term "insoluble component," as used herein, is one or more compounds that phase separate out of the castor-free AGHA over time, especially when held at room temperature and below. The castor-free AGHA is a liquid at room temperature and the insoluble component may phase separate out of the liquid phase castor-free AGHA as a solid phase. The insoluble component turns the castor-free AGHA cloudy and settles to the bottom. The lower the temperature, the more insolubles are formed. Furthermore, the quality of raw materials (such as glycerol and fatty acid) used to make the castor-free AGHA has an effect on the amount of insolubles formed after acetylation, as well as the color of the castor-free AGHA.

The castor-free AGHA may be subjected to a purification process to reduce the color and decrease the amount of insolubles. A "purification process," as used herein, is the application of one or more of the following procedures to the castor-free AGHA: a filtration procedure, a centrifugation procedure, a sedimentation procedure, treatment with additives [such as silicon dioxide ($SiO_2$), aluminum oxide ($Al_2O_3$), activated carbon, Perlite (naturally occurring amorphous siliceous volcanic rock), diatomaceous earth] and combinations thereof. Any of these procedures may optionally be performed at a temperature from 5° C. to 50° C. and holding at this temperature for at least 3 hours. The additives may be used to aid the filtration step and may also result in desirably lighter color of the castor-free AGHA. The purification process removes, wholly or partially, any insoluble components present in the castor-free AGHA and can also result in desirably lighter color. Treatment of the castor-free AGHA with additives, followed by filtration, can also be performed at temperatures as high as 150° C. to result in lighter color, without necessarily decreasing the amount of insolubles. With removal of the solid phase from the castor-free AGHA and/or lighter color, the resultant filtrate from the purification process is clear and has low, or no, turbidity. A "purified AGHA" is an AGHA that has been subjected to at least one of the foregoing purification processes and exhibits at least one of the following properties: lighter color, fewer (or no) insoluble components, and/or less (or no) turbidity when compared to the AGHA prior to purification.

Any of the foregoing compositions may include one, two, three, or more other plasticizers. In an embodiment, a composition is provided and includes a first plasticizer and a second plasticizer. The first plasticizer can be an AGHA or castor-free AGHA as previously discussed herein. The second plasticizer can be an epoxidized fatty acid ester or other plasticizer. In an embodiment a composition is provided and includes a blend of (i) the AGHA and (ii) an epoxidized fatty acid ester (EFA). The term "epoxidized fatty acid ester," as used herein, is a compound with at least one fatty acid moiety which contains at least one epoxide group. An "epoxide group" is a three-membered cyclic ether (also called oxirane or an alkylene oxide) in which an oxygen atom is joined to each of two carbon atoms that are already bonded to each other. Nonlimiting examples of suitable epoxidized fatty acid esters include epoxidized animal and vegetable oils, such as naturally occurring epoxidized oils, epoxidized natural seed oil, epoxidized propylene glycol dioleate, epoxidized fatty acid methyl esters (or e-FAME), epoxidized fish oil, epoxidized beef tallow oil, epoxidized methyl stearate, epoxidized butyl stearate, epoxidized 2-ethylhexyl stearate, epoxidized stearyl stearate, 3,4-epoxycyclohexylmethyl-3,4-epoxycyclohexane carboxylate epoxidized soybean oil, epoxidized derivatives of each of the foregoing, and any combination of the foregoing. A nonlimiting example of naturally occurring epoxidized oil is Vernonia oil. Nonlimiting examples of epoxidized natural seed oils include epoxidized soybean oil (ESO), epoxidized palm oil, epoxidized linseed oil, epoxidized corn oil, epoxidized sunflower oil, epoxidized canola oil, epoxidized rapeseed oil, epoxidized safflower oil, epoxidized tall oil, epoxidized tung oil, epoxidized castor oil and others, and any combination of the foregoing. The second plasticizer may also include epoxidized polybutadiene, tris(epoxypropyl)isocyanurate, bisphenol A diglycidyl ether, vinylcyclohexene diepoxide, dicyclohexene diepoxide, and any combination thereof.

The epoxidized fatty acid ester can be prepared in a variety of ways. For example, natural oils can be used as the starting material. In this instance, the natural oils may be saponified to the fatty acids and then esterified with alcohols. Next, the low molecular weight esters are epoxidized. The unsaturated ester can be epoxidized with a per-acid.

Alternatively, a glycidyl ester of the fatty acid can be prepared via epichlorohydrin or related chemicals. In yet another alternate, it is possible to transesterify the triglyceride with alcohols and then epoxidize the unsaturated fatty ester with a per-acid.

In an embodiment, the epoxidized fatty acid ester can be any epoxidized fatty acid $C_1$-$C_{14}$ ester, including methyl, ethyl, propyl, butyl, and 2-ethylhexyl esters. In a further embodiment, the epoxidized fatty acid ester is an epoxide of a fatty acid methyl ester.

A nonlimiting example for the preparation of an epoxide of a fatty acid methyl ester begins with soy oil, wherein the soy oil is transesterified with methanol to make the methyl ester of the fatty acids in the oil. Glycerol is removed from the reaction products due to insolubility. A solution of per-acetic acid in ethyl acetate is used to epoxidize the double bonds on the fatty acids. The per-acid is kept below 35% per-acid and 35 degrees Celsius to prevent detonation. After completion, the ethyl acetate and product acetic acid are removed via vacuum stripping.

In an embodiment, the epoxidized fatty acid ester is epoxidized soybean oil.

The castor-free AGHA alone or in combination with the EFA, may be referred to as a "composition", "plasticizer composition," "plasticizer," or "castor-free AGHA/EFA plasticizer". When the plasticizer composition is a blend of AGHA and EFA, it may include from 1 wt % to 100 wt % castor-free acetylated glyceride of 12-hydroxystearic acid and from 99 wt % to 0 wt % EFA, or from 30 wt % to 99 wt % castor-free acetylated glyceride of 12-hydroxystearic acid and from 70 wt % to 1 wt % EFA (based on the total weight of the plasticizer composition).

A "plasticizer composition" or "plasticizer" is a substance that is added to a polymer resin to impart softness and flexibility. Such substance may also lower the modulus and tensile strength, and increase flexibility, elongation, impact strength, and tear strength of the polymeric resin (typically a thermoplastic polymer) to which it is added. A plasticizer may also lower the melting point of the polymeric resin, lower the glass transition temperature and enhancing processability of the polymeric resin to which it is added.

The plasticizer composition includes one, two, three, or more plasticizers. In an embodiment, the plasticizer composition includes a first plasticizer that is one or more castor-free AGHA and a second plasticizer that is one or more EFA. In an embodiment, the plasticizer composition includes a castor-free AGHA having a hydroxyl number from 0 to less than 100, or from 0 to less than 15, or from 0 to less than 10, or from 0 to less than 5, or from 0 to less than 2, or 0, and epoxidized soybean oil (ESO). In a further embodiment, the castor-free AGHA of the plasticizer composition has a hydroxyl number of 0 and the plasticizer composition also includes ESO.

In an embodiment, the plasticizer composition includes a castor-free AGHA, a first EFA, and a second EFA. The second EFA is different than the first EFA. In a further embodiment, the plasticizer composition includes castor-free AGHA, ESO, and an epoxidized propylene glycol dioleate. In yet another embodiment, the plasticizer composition includes castor-free AGHA, ESO, and an epoxidized fatty acid methyl ester (or e-FAME).

Although the composition of this disclosure may be phthalate-free, in an embodiment, the plasticizer composition may also comprise other plasticizers including, but not limited to, phthalates (such as di-isononyl phthalate, diallyl phthalate, di-2-ethylhexyl-phthalate, dioctyl phthalate, diisodecyl phthalate and diisotridecyl phthalate), trimellitates (such as trioctyl trimellitate, triisononyl trimellitate and triisodecyl trimellitate), citrates, Grindsted® Soft-N-Safe acetylated monoglyceride of hydrogenated castor oil (product of Danisco), Hexamoll® DINCH diisononyl ester of 1,2-Cyclohexanedicarboxylic acid (product of BASF), benzoates and adipic polyesters.

The present plasticizer composition may comprise two or more embodiments disclosed herein.

The present composition composed of a first plasticizer that is a castor-free AGHA alone or in combination with a second plasticizer containing any EFA or other plasticizers may be used in a variety of compositions or products. Nonlimiting examples of suitable applications for the composition include cosmetic composition/products, food compositions/products, polymeric compositions/products, soft thermoplastic polyolefins, profiles (gaskets), films, etc.

The present disclosure provides a polymeric composition. In an embodiment, a polymeric composition is provided which includes a polymeric resin and the present plasticizer composition. The plasticizer composition may be composed of one, two, three or more plasticizers such as a first plasticizer (i.e., any castor-free AGHA) alone or in combination with a second plasticizer containing any one or more EFA or other plasticizer as disclosed herein. The polymeric composition contains from 1 wt % to 99 wt %, or from 30 wt % to 90 wt %, or from 40 wt % to 80 wt % polymeric resin, and from 99 wt % to 1 wt %, or from 70 wt % to 10 wt %, or from 60 wt % to 20 wt % of the plasticizer composition. Weight percent is based on total weight of the composition.

Nonlimiting examples of suitable polymeric resins include polysulfides, polyurethanes, acrylics, epichlorohydrins, nitrile rubber, chlorosulfonated polyethylene, chlorinated polyethylene, polychloroprene, styrene butadiene rubber, natural rubber, synthetic rubber, EPDM rubber, propylene-based polymers, ethylene-based polymers, and vinyl chloride resins. The term, "propylene-based polymer," as used herein, is a polymer that comprises a majority weight percent polymerized propylene monomer (based on the total amount of polymerizable monomers), and optionally may comprise at least one polymerized comonomer. The term, "ethylene-based polymer," as used herein, is a polymer that comprises a majority weight percent polymerized ethylene monomer (based on the total weight of polymerizable monomers), and optionally may comprise at least one polymerized comonomer.

The term "vinyl chloride resin," as used herein, is a vinyl chloride polymer, such as polyvinyl chloride (PVC), or a vinyl chloride copolymer such as vinyl chloride/vinyl acetate copolymer, vinyl chloride/vinylidene chloride copolymer, vinyl chloride/ethylene copolymer or a copolymer prepared by grafting vinyl chloride onto ethylene/vinyl acetate copolymer. The resin composition can also include a polymer blend of the above-mentioned vinyl chloride polymer or vinyl chloride copolymer with other miscible or compatible polymers including, but not limited to, chlorinated polyethylene, thermoplastic polyurethane, olefin polymers such as a methacryl polymer or acrylonitrile-butadiene-styrene polymer (ABS resin).

In an embodiment, the vinyl chloride resin is polyvinyl chloride (PVC).

In an embodiment, the polymeric composition is a thermoplastic composition. A "thermoplastic composition," as used herein, is a polymeric composition that softens when exposed to heat and returns to substantially its original condition when cooled to room temperature.

In an embodiment, the polymeric composition includes the polymeric resin and a plasticizer composition including a first plasticizer of one or more castor-free AGHA, and optionally a second plasticizer composed of optionally a first EFA, and optionally a second EFA.

Applicants have surprisingly discovered that the plasticizer composition composed of castor-free AGHA and optionally EFA unexpectedly provides a plasticizer with low volatility which is particularly suitable for high temperature wire and cable applications, and which does not migrate out of a thermoplastic polymer in which it is incorporated. In addition, the solution temperature (of 140° C.-180° C.) for the present plasticizer composition is similar to the solution temperature of conventional high molecular weight plasticizers and some conventional phthalate plasticizers (typically between 140° C. and 180° C.).

Moreover, the viscosity of the present plasticizer composition is less than the viscosity of conventional high molecular weight plasticizers, such as adipic polyester plasticizers. For example, adipic polyester plasticizers, known commercially as Ultramoll® IV and Ultramoll® III adipic polyesters (products of Lanxess) have very high viscosity (approximately 6000 to 6500 mPas at 25° C.). It is known that the lower the viscosity of a plasticizer, the faster is its uptake into PVC powder. Hence, the present plasticizer composition is absorbed into PVC at a faster rate than adipic polyester plasticizers, and even phthalates or trimellitates of lower or similar viscosity. The present plasticizer composition exhibits an unexpected synergy between low viscosity and medium molecular weight and yields a phthalate-free, safe, plasticized PVC with physical, chemical, and mechanical properties that meet and/or exceed the properties of PVC resins plasticized with conventional adipic polyester plasticizers or conventional phthalate-based plasticizers or conventional trimellitate-based plasticizers. Especially noteworthy is the retention of tensile properties exhibited by the present composition after oven aging for 168 hours at temperatures as high as 113° C. or 136° C.

The present polymeric composition exhibits the same, or better, flexibility and/or elongation when compared to polymer resins containing conventional adipic polyester, phthalate, and/or trimellitate plasticizers. In an embodiment, the present polymeric composition is a blend of PVC and a castor-free AGHA/EFA plasticizer and has a Shore hardness from about A60 to about A100, or from about A70 to about A95. In an embodiment, the polymeric composition has a Shore hardness from about D10 to about D70, or from about D20 to about D60. Shore hardness is measured in accordance with ASTM D2240. Applicants have surprisingly discovered that the present castor-free AGHA provides unexpectedly strong performance as a plasticizer for high temperature applications and high temperature wire and cable plasticizer applications in particular. Bounded by no particular theory, it is believed that the absence of castor oil fatty acid glycerides (and derivatives thereof) in the present castor-free AGHA contributes to the following properties: high solution temperature, low mass loss at 136° C., high viscosity, low tensile strength retention after seven days 113° C./136° C. aging, high tensile elongation retention after 7 days 113° C./136° C. aging, and high weight retention after seven days at 136° C.

In an embodiment, the polymeric composition is composed of a blend of PVC and the AGHA/EFA plasticizer. The polymeric composition is molded into a plaque. The plaque has a tensile strength retention from 70% to 125% after 168 hours heat aging at 113° C. as measured on dogbones cut from 30 mil thick plaques in accordance with ASTM D638.

In an embodiment, the polymeric composition is composed of a blend of PVC and the AGHA/EFA plasticizer. The polymeric composition is molded into a plaque. The plaque has a tensile strength retention from 70% to 150% after 168 hours heat aging at 136° C. as measured on dogbones cut from 30 mil thick plaques in accordance with ASTM D638.

In an embodiment, the polymeric composition is composed of a blend of PVC and the castor-free AGHA/EFA plasticizer. The polymeric composition is molded into a plaque. The plaque has a tensile elongation retention greater than about 20%, or greater than about 40%, after 168 hours heat aging at 113° C. as measured on dogbones cut from 30 mil thick plaques in accordance with ASTM D638.

In an embodiment, the polymeric composition is composed of a blend of PVC and the castor-free AGHA/EFA plasticizer. The polymeric composition is molded into a plaque. The plaque has a tensile elongation retention greater than about 20%, or greater than about 40%, after 168 hours heat aging at 136° C. as measured on dogbones cut from 30 mil thick plaques in accordance with ASTM D638.

The tensile strength and tensile elongation are measured for (i) unaged and (ii) heat aged specimens cut from compression molded plaques in accordance with ASTM D-638.

In an embodiment, the polymeric composition is composed of a blend of PVC and the AGHA/EFA plasticizer. The polymeric composition is molded into a plaque. Specimens of 1.25 inch diameter that are cut from 30 mil thick molded plaques retain greater than 90 wt %, or greater than 92 wt % to 100 wt %, of its weight after 168 hours heat aging at 136° C.

Any of the foregoing polymeric compositions may include one or more of the following additives: a filler, an antioxidant, a flame retardant (antimony trioxide, molybdic oxide and alumina hydrate), a heat stabilizer, an anti-drip agent, a colorant, a lubricant, a low molecular weight polyethylene, a hindered amine light stabilizer (having at least one secondary or tertiary amine group) ("HALS"), UV light absorbers (such as o-hydroxyphenyltriazines), curing agents, boosters and retardants, processing aids, coupling agents, antistatic agents, nucleating agents, slip agents, viscosity control agents, tackifiers, anti-blocking agents, surfactants, extender oils, acid scavengers, metal deactivators, and any combination thereof.

In an embodiment, the polymeric composition includes a filler. Nonlimiting examples of suitable fillers include calcium carbonate, calcined clay, whiting, fuller's earth, magnesium silicate, barium sulfate, calcium sulfate, strontium sulfate, titanium dioxide, magnesium oxide, magnesium hydroxide, calcium hydroxide, hydrophilic fumed silica, hydrophobic (surface treated) fumed silica, and any combination of the foregoing. Nonlimiting examples of calcined clay are Satintone® SP-33 and Polyfil® 70.

In an embodiment, the polymeric composition includes an antioxidant. Nonlimiting examples of suitable antioxidants include hindered phenols such as tetrakis[methylene(3,5-di-tert-butyl-4-hydroxyhydro-cinnamate)]methane; bis[(beta-(3,5-ditert-butyl-4-hydroxybenzyl)-methylearboxyethyl)] sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha,alpha-dimethylbenzyl)diphenylamine, diphenyl-p-phenylenediamine, mixed di-aryl-p-phenylenediamines, and other hindered amine anti-degradants or stabilizers. Nonlimiting examples of suitable antioxidants include Topanol® CA, Vanox® 1320, Irganox® 1010, Irganox® 245 and Irganox® 1076. The antioxidant or antioxidants may be added to the plasticizer composition of this disclosure. Antioxidants can be used in amounts of 0.01 to 5 wt % based on the weight of the polymeric composition.

In an embodiment, the polymeric composition includes a heat stabilizer. Nonlimiting examples of suitable heat stabilizers include lead-free mixed metal heat stabilizers, lead stabilizers, organic heat stabilizers, epoxides, salts of mono-carboxylic acids, phenolic antioxidants, organic phosphites, hydrotalcites, zeolites, perchlorates and/or betadiketones. Nonlimiting examples of suitable betadiketones are dibenzoylmethane, palmitoyl benzoyl methane, stearoyl benzoyl methane and mixtures thereof. A nonlimiting example of suitable dibenzoylmethane is Rhodiastab® 83. A nonlimiting example of suitable mixtures of palmitoyl benzoyl methane and stearoyl benzoyl methane is Rhodiastab® 50. Nonlimiting examples of suitable lead-free mixed metal heat stabilizers include Mark® 6797, Mark® 6776 ACM, Mark® 6777 ACM, Therm-Chek® RC215P, Therm-Chek® 7208, Naftosafe® EH-314, Baeropan® MC 90400 KA, Baeropan® MC 90400 KA/1, Baeropan® MC8553 KA-ST 3-US, Baeropan® MC 9238 KA-US, Baeropan® MC 90249 KA, and Baeropan® MC 9754 KA. The heat stabilizer or heat stabilizers may be added to the plasticizer composition of this disclosure. Heat stabilizers can be used in amounts of 0.1 to 10 wt % based on the weight of the polymeric composition.

In an embodiment, the polymeric composition includes a lubricant. Nonlimiting examples of suitable lubricants include stearic acid, metal salts of stearic acid, paraffin wax, and polyethylene glycols. The lubricants may be used alone or in combination. The lubricant may also be combined with the heat stabilizer.

In an embodiment, the polymeric composition includes a processing aid. Nonlimiting examples of suitable processing aids include metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; and polysiloxanes. Processing aids can be used in amounts of 0.05 to 5 wt % based on the weight of the polymeric composition.

The polymeric compositions are generally prepared according to conventional dry blend or wet blend methods known to those skilled in the art of PVC compounding. The mixtures obtained from the blending process can be further compounded with a mixer such as a Banbury batch mixer, a Farrel Continuous Mixer, or a single or twin screw extruder.

In an embodiment, the present polymeric composition is made by absorption of the plasticizers of this disclosure in PVC powder to make a dry blend. Any suitable method/apparatus may be used to make the dry blend including, but not limited to, a Henschel mixer or a ribbon blender. The polymeric composition may contain other additives in addition to the PVC and the plasticizer. The dry blend may then be further compounded (via melt extrusion for example) and formed into any desired shape (film, pellet, etc.).

With an optimal stabilizer and antioxidant package, the present polymeric compositions of this disclosure are suitable for applications requiring long term dry or wet insulation resistance testing at elevated temperatures, and other demanding applications where temperatures are as high as 136° C. (either in air or while immersed in oils).

The present polymeric composition(s) may comprise two or more embodiments disclosed herein.

The surprising properties of flexibility, low plasticizer volatility, low migration, low viscosity and/or high solution temperature exhibited by the present polymeric composition make it well suited for wire and cable coating applications, and high temperature wire/cable applications in particular. Accordingly, the present disclosure provides a coated conductor. A "conductor" is an element of elongated shape (wire, cable, fiber) for transferring energy at any voltage (DC, AC, or transient). The conductor is typically at least one metal wire or at least one metal cable (such as aluminum or copper) but may include optical fiber.

In an embodiment, a coated conductor is provided and includes a conductor and a coating on the conductor. The coating is composed of the present polymeric composition which includes the polymeric resin and the present plasticizer composition containing one, two, three, or more plasticizers. The polymeric resin of the coating may be any polymeric resin disclosed herein. The plasticizer composition may be any plasticizer composition composed of one or more AGHA (i.e., castor-free AGHA) alone or blended with one or more EFA, and/or blend with one or more other plasticizers as disclosed herein.

A "metal conductor," as used herein, is at least one metal wire and/or at least one metal cable. The coated metal conductor may be flexible, semi-rigid, or rigid. The coating (also referred to as a "jacket" or a "sheath" or "insulation") is on the metal conductor or on another polymeric layer around the conductor. The coating includes the present composition. The composition may be any composition as disclosed herein. As used herein, "on" includes direct contact or indirect contact between the coating and the metal conductor. "Direct contact" is a configuration whereby the coating immediately contacts the metal conductor, with no intervening layer(s) and/or no intervening material(s) located between the coating and the metal conductor. "Indirect contact" is a configuration whereby an intervening layer(s) and/or an intervening structure(s) and/or intervening material(s) is/are located between the metal conductor and the coating. The coating may wholly or partially cover or otherwise surround or encase the metal conductor. The coating may be the sole component surrounding the metal conductor. Alternatively, the coating may be one layer of a multilayer jacket or sheath encasing the metal conductor.

In an embodiment, the polymeric resin is a vinyl chloride resin such as PVC as discussed above. The PVC is blended with the plasticizer composition to form the coating. The coating may include additional components. In an embodiment, the coating includes from about 1 wt % to about 99 wt % or from about 20 wt % to about 80 wt %, or from about 30 wt % to about 70 wt % PVC and from 99 wt % to about 1 wt %, or from about 80 wt % to about 20 wt %, or from about 70 wt % to about 30 wt % plasticizer composition. In a further embodiment, the coating contains from about 30 wt % to about 90 wt % PVC and from about 70 wt % to about 10 wt % of the plasticizer composition.

The plasticizer composition may be any plasticizer composition disclosed herein. In an embodiment, the castor-free AGHA present in the coating has a hydroxyl number from 0 to less than 100, or from 0 to less than 15, or from 0 to less than 10, or from 0 to less than 5, or from 0 to less than 2, or 0.

The coating may have any of the properties as discussed above for the present composition. In an embodiment, the coated conductor passes the heat test as measured in accordance with UL-1581. In another embodiment, the plasticizer composition in the coating has a solution temperature from about 140° C. to about 180° C. In another embodiment, the coating has a Shore hardness from about A60 to about A100 as measured in accordance with ASTM D2240. In another embodiment, the coating has a Shore hardness from about D10 to about D70 as measured in accordance with ASTM D 2240. In an embodiment, the coating includes from about 30 wt % to about 90 wt % of polyvinyl chloride and from about 70 wt % to about 10 wt % of castor-free AGMA or a blend of castor-free AGHA and EFA.

Nonlimiting examples of suitable coated metal conductors include flexible wiring such as flexible wiring for consumer electronics, a power cable, a power charger wire for cell phones and/or computers, computer data cords, power cords, appliance wiring material, building wire, automotive wire, and consumer electronic accessory cords.

The present coated conductor may comprise two or more embodiments disclosed herein.

The coated conductor, such as a coated wire or a coated cable (with an optional insulation layer), with a jacket comprising the composition disclosed herein can be prepared with various types of extruders, e.g., single or twin screw types. A description of a conventional extruder can be found in U.S. Pat. No. 4,857,600. An example of co-extrusion and an extruder can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1.

The wire and cable constructions (i.e., a coated metal conductor) of this disclosure are made by extruding the present polymeric composition onto the conductor or onto the bundle of insulated conductors to form a coating (or a jacket) around the insulated conductors. The thickness of the jacket or insulation depends on the requirements of the desired end use application. Typical thickness of the jacket or insulation is from about 0.010 inches to about 0.200 inches, or from about 0.015 inches to about 0.050 inches. The present polymeric composition may be extruded into the jacket from previously made composition. Usually the present composition is in the form of pellets for easy feeding into the extruder. The wire and cable jacket or insulation may be extruded directly from the compounding extruder without going through the separate step of pelletizing the present composition. This one-step compounding/extrusion process would eliminate one heat history step for the composition.

A nylon layer may also be extruded over the insulation, such as in conventional THHN, THWN and THWN-2 constructions.

Nonlimiting examples of embodiments of the present disclosure are provided below.

Test Methods

APHA color is measured using Color Quest XE colorimeter, available from HunterLab, or equivalent; 20-mm transmission cell; HunterLab Universal software, version 4.10 or equivalent; Black and White color reference titles available from HunterLab, or equivalent; the measured APHA color value of deionized (DI) water is zero.

Acid number (or "acid value") is a measure of the amount of free acid present in a compound. The acid number is the number of milligrams of potassium hydroxide required for the neutralization of free acid (fatty acid and/or other acid such as acetic acid, for example) present in one gram of a substance. The acid number is determined in accordance with German Standard DIN 53402 (mg KOH/g).

Density at 25° C. is determined in accordance with German Standard DIN 51 757 (g/cm$^3$).

Dynamic storage modulus (G') and glass transition temperature (Tg) are determined by dynamic mechanical analysis (DMA) using a TA Instrument AR1000N Rheometer having DMA fixtures. The specimen is in the form of a rectangular solid and tested in tension mode. The temperature is varied from −100° C. to +160° C. at a ramp rate of 5° C./min, and the test frequency is held constant at 6.283 rad/s (1 Hz). The storage and loss modulus of the sample, as well as the tan delta, are measured as a function of the temperature. The glass transition temperature (Tg) is determined from the peak tan delta measurement. Dynamic storage modulus (G') at −20° C. is used as a measure of low temperature flexibility. The storage and loss modulus of viscoelastic materials are measures of the stored energy (representing the elastic portion) and the energy dissipated as heat (representing the viscous portion).

Hydroxyl Number (or hydroxyl value) is an indication of the degree of acetylation and is a measure of the number of hydroxyl groups present in a polymer. The hydroxyl number is the number of milligrams of potassium hydroxide required to neutralize the hydroxyl groups in one gram of polymer. The hydroxyl number is determined in accordance with German Standard DIN 53 240 (mg KOH/g).

Iodine value is an indication of the degree of hydrogenation and is determined in accordance with German Einheitsmethode DGF C-V 11a (53) (g I$_2$/100 g).

Plasticizer compatibility in the polymeric composition is assessed by visual inspection of molded or extruded specimens aged at elevated temperatures (e.g., 113° C. or 136° C.)

for defined lengths of time (e.g., 7 days). The extruded specimens may be in the form of a wire (i.e., insulation extruded over conductor). The amount of exudate (spew) on surface after 7 days at 113° C. or 136° C. is rated as "none", "slight", "moderate", or "heavy".

Shore hardness is determined in accordance with ASTM D 2240.

Solution Temperature is the temperature at which a heterogeneous mixture of plasticizer and a PVC resin is observed to change to a single phase. Solution temperature is determined by immersing 1 gram PVC in 20 grams of plasticizer and increasing the temperature stepwise until the PVC is seen to be completely dissolved by observation under a microscope, in accordance with German Standard DIN 53 408 (° C.).

Temperature of 5% mass loss (° C.) and mass loss at 136° C. are determined using TG/DTA 220. The plasticizer specimen is heated from room temperature up to 600° C. at 10 K/min under inert gas purge, and the appearing mass loss and thermal effects are recorded in thermograms. The higher the temperature for 5% mass loss, and the less the mass loss at 136° C., the lower the plasticizer volatility.

Tensile strength (TS), tensile strength retention (TSR), tensile elongation (TE), and tensile elongation retention (TER) (at 2 inch/min) on unaged specimens, on specimens aged at 113° C. or at 136° C. for 168 hours, is determined in accordance with ASTM D 638 and UL 1581/2556 either on dogbones cut from molded plaques or tubular insulations removed from coated conductors (extruded wires).

The term "UL 1581" is Underwriters Laboratories Reference Standard for Electrical Wires, Cables, and Flexible Cords. UL 1581 contains specific details for conductors, insulation, jackets and other coverings, and for methods of sample preparation, specimen selection and conditioning, and for measurement and calculation that are required in wire and cable standards.

Viscosity is determined in accordance with Standard ASTM D 445, Brookfield-Viscosimeter at 25° C. and/or 40° C.

Volume resistivity (Ohm-cm at 23° C.) is measured with 500 volts direct current, in accordance with ASTM D 257. Specimens of 3.5 inch diameter are cut from 40 mil thick molded plaques and tested using a Hewlett Packard 16008A Resistivity Cell connected to a Hewlett Packard 4329A High Resistance Meter.

Water content is determined in accordance with German Standard DIN 51 777(%).

Weight Retained (%) after 7 Days at 136° C. is measured on specimens of 1.25 inch diameter that are cut from 30 mil thick molded plaques.

By way of example, and not by limitation, examples of the present disclosure are provided.

EXAMPLES

A. Nominal Acetylated monoester of glycerin and 12-hydroxystearic acid

Examples 1-2

Example 1

Preparation of nominal acetylated monoester of glycerin and 12-hydroxysearic acid and its properties as follows:

36.8 g (0.4 mol) glycerine, 120.2 g (0.4 mol) 12-hydroxystearic acid and 0.39 g catalyst tin (II) octoate are added to a 1 L one-neck glass flask. The flask is fixed to a rotation evaporator. After heating to 160° C., the flask is flushed with nitrogen and evacuated (3-5 times). The pressure is adjusted to approximately 10-20 mbar, the temperature is adjusted to 180° C. and the reaction is monitored via distillation of water. The reaction is stopped after 6 hours by cooling to room temperature.

134 g (1.32 mol) acetic anhydride is added and the flask is heated to 100° C. After 3 hours, the temperature is increased to 120° C. for 1 hour. The acetic acid is distilled off at 120° C. under a vacuum. The product, nominal acetylated monoglyceride of 12-hydroxystearic acid (or AMHA), is a yellow, liquid. Its properties are set forth in Table 1 below.

Example 2

Preparation of nominal acetylated monoester of glycerin and 12-hydroxystearic acid and its properties as follows:

23 g (0.25 mol) glycerine, 75.1 g (0.25 mol) 12-hydroxystearic acid and 0.24 g catalyst tin (II) octoate are added to a 1 L on-neck glass flask. The flask is fixed to a rotation evaporator. After heating to 160° C., the flask is flushed with nitrogen and evacuated (3-5 times). The pressure is adjusted to approximately 10-20 mbar, the temperature is adjusted to 180° C. and the reaction is monitored via distillation of water. The reaction is stopped after 6 hours by cooling to room temperature.

84 g (0.82 mol) acetic anhydride is added and the flask is heated to 100° C. (under normal pressure). After 3 hours, the temperature is increased to 120° C. for 1 hour. The acetic acid is distilled off at 120° C. under a vacuum. The product, nominal acetylated monoglyceride of 12-hydroxystearic acid (or AMHA), is a yellow, liquid. Its properties are set forth in Table 1 below.

B. Nominal Acetylated glyceryl mono-12-hydroxystearate

Examples 3-4

Example 3

Preparation of nominal acetylated glyceryl mono-12-hydroxystearate and its properties as follows:

150 g glyceryl mono-12-hydroxystearate and 103 g acetic anhydride are added to a 500 mL-flask. The flask includes a mechanical stirrer and common distillation glassware and is fixed in a preheated bath. The temperature is maintained at 115° C. over 4 hours. A vacuum from 800 to 150 mbar is used to remove the residual acetic acid at a bath temperature of 115° C. The product, nominal acetylated monoglyceride of hydroxystearic acid (or AMHA), is a yellow, cloudy liquid. Its properties are set forth in Table 1.

Example 4

Preparation of nominal acetylated glyceryl mono-12-hydroxystearate and its properties as follows:

150 g glyceryl mono-12-hydroxystearate and 107 g acetic anhydride are added to a 500 mL-flask. The flask includes a mechanical stirrer and common distillation glassware and is fixed in a preheated bath. The temperature is maintained at 115° C. over 4 hours. A vacuum from 800 to 150 mbar is used to remove the residual acetic acid at a bath temperature of 115° C. The product, nominal acetylated monoglyceride of hydroxystearic acid (or AMHA), is a yellow, cloudy liquid. Its properties are set forth in Table 1.

The other plasticizers examined include Grindsted Soft-N-Safe® available from Danisco, and diisodecyl phthalate (DIDP), available from TCI Japan.

Comparative Sample 1

A comparative sample of Grindsted Soft-N-Safe®, an acetylated monoglyceride of castor wax, is used. The physical appearance at room temperature of Grindsted Soft-N-Safe® is an almost clear liquid at room temperature. It is compared to Examples 1-4 of nominal AMHA in Table 1.

Comparative Sample 2

A comparative sample of DIDP, diisodecyl phthalate, is also used and its properties compared to Examples 1-4 in Table 1.

Table 1 below sets forth the properties of Examples (Ex) 1-4 and Comparative Samples (CS) 1-2.

TABLE 1

| Plasticizer | Ex. 1: Nominal AMHA | Ex. 2: Nominal AMHA | Ex. 3: Nominal AMHA | Ex. 4: Nominal AMHA | CS 1: Grindsted Soft-N-Safe ® | CS 2: DIDP |
|---|---|---|---|---|---|---|
| Appearance | Yellow liquid | Yellow liquid | Yellow cloudy liquid | Yellow cloudy liquid | Almost clear liquid | |
| Iodine Value [g $I_2$/100 g] | 3 | 3 | 5 | 5 | 4 | |
| Acid Number [mg KOH/g] (DIN 53 402) | 0.6 | 1.5 | 3 | 3.1 | 1.5 | |
| Hydroxyl Number [mg KOH/g] (DIN 53 240) | 0 | 0 | 4.2 | 0 | 0 | |
| Solution Temperature in PVC [° C.] (DIN 53 408) | 163.5 | 161.5 | 162 | 160.5 | 151 | 141.5 |
| Temperature of 5% mass loss (TG/TGA) [° C.] | 165 | 179 | 276 | 278 | 266 | 239.5 |
| Mass loss at 136° C. (TGA) [%] | 6.3 | 4.3 | <0.1 | <0.1 | <0.1 | <0.1 |
| Water [%] (DIN 51 777) | 0.018 | 0.050 | 0.02 | 0.012 | 0.031 | 0.064 |
| Viscosity [mPas] at 25° C. ASTM D445 | 120 | 140 | 200 | 150 | 100 | 79 |
| Viscosity [mPas] at 40° C. ASTM D445 | Not available | Not available | 70 | 65 | 45 | Not Available |
| Density at 25° C. [g/cm$^3$] (DIN 51 757) | 0.993 | 0.995 | 0.984 | 0.985 | 0.999 | 0.965 |

The plasticizers of Examples 1-4 are all free of castor oil fatty acid glycerides and are different from Grindsted Soft-N-Safe®, which is produced from castor oil and contains castor oil fatty acid glycerides. Furthermore, unlike the Grindsted Soft-N-Safe® material, the plasticizers of Examples 1-4 are also likely to be mixtures of AMHA, ADHA, ATHA, triacetin and possibly glycerol. Examples 3 and 4 are free, or substantially free of, free glycerine.

FIG. 1 is a thermogram of pure triacetin for comparison reasons, which shows the TG curve sharply declining around 130° C. and complete mass loss through evaporation by about 220° C. The temperature of 5% mass loss was 147° C. This extremely high volatility is consistent with the boiling point for triacetin, which is about 260° C. The smaller peak at 269° C. indicates the start of the degradation.

FIG. 2 shows TG/DTA thermograms or TG thermograms of Examples 1 and 2. These materials show identical mass loss of about 20% as the temperature reaches about 220° C. This is believed to be due to the presence of highly volatile triacetin in Examples 1 and 2. The corresponding temperatures of 5% mass loss are shown in Table 1.

FIG. 3 shows TG/DTA thermograms or TG thermograms of Example 1 compared to Grindsted Soft-N-Safe®. Example 1 shows the characteristic mass decline up to about 200° C. (attributed to the presence of triacetin), whereas Grindsted Soft-N-Safe® does not. The corresponding temperatures of 5% mass loss are shown in Table 1, and are relatively greater for Grindsted Soft-N-Safe®. This confirms that the compositions of Examples 1 and 2 are very different from that of Grindsted Soft-N-Safe® (which is substantially less volatile).

FIG. 4 shows TG/DTA thermograms of Examples 3 and 4. The corresponding temperatures of 5% mass loss are shown in Table 1. In contrast to Examples 1 and 2, these materials are substantially less volatile (due to the absence of triacetin). In fact, they are even less volatile than Grindsted Soft-N-Safe®, indicating that the compositions of Examples 3 and 4 were different from that of the Grindsted Soft-N-Safe® product.

FIG. 5 shows SEC/RI overlay chromatograms for Example 1, Example 2, the raw materials and the formed triacetin. The chromatogram illustrates the presence of triacetin in example 1 and in example 2 (peak at 17 minutes retention time).

FIG. 6 shows SEC/RI overlay chromatograms for Example 2 compared to Grindsted Soft-N-Safe®. FIG. 6 confirms that Example 2 (which contains triacetin, ADHA, and ATHA) is significantly different from that of Grindsted Soft-N-Safe®. No triacetin was determined.

FIG. 7 shows SEC/RI overlay chromatograms for example 3 compared to the utilized raw material 12-hydroxy stearic acid mono glyceride. FIG. 7 shows that Example 3 contains no triacetin and does contain ADHA and ATHA. The presence of di- and tri-esters are shown and illustrated by the molecular weight shown in the table of FIG. 7.

In summary, the compositions of Examples 1-4 are different from the Grindsted Soft-N-Safe® (CS 1) and DIDP (CS2). The compositions of Examples 1-2 have a greater volatility, e.g., a lower temperature of 5% mass loss, but unexpectedly a desirably higher solution temperature, as compared to CS 1. The compositions of Examples 3-4 unexpectedly exhibit improved thermal stability, a lower volatility (i.e., higher temperature of 5% mass loss) as well as a desirably higher solution temperature than CS 1 and CS 2. Higher solution temperatures are advantageous as they ensure long-term retention of properties after heat aging, as long as the solution temperature does not exceed 180° C. Higher solution temperatures also ensure that the plasticizer substance does not come out of solution when blended in composition with a polymer. Bounded by no particular theory, it is believed that the absence of castor oil fatty acid glycerides, alone or in combination with the absence of free glycerine, in Examples 3 and 4 contributes to these unexpected results.

The plasticizers of Examples 1-2 exhibit similar properties and also have a hydroxyl number of about 0 mg KOH/g. The plasticizer of Example 4 also has a hydroxyl number of about 0 mg KOH/g. The plasticizer of Example 3 has a hydroxyl number of less than 5 mg KOH/g.

C. Thermoplastic Compositions: Blends of PVC, Nominal AMHA & EFA

1. Examples 5-7 and Comparative Samples 3-4

Blends of polyvinylchloride (PVC) with various plasticizers and additives are prepared. The primary plasticizers evaluated are nominal AMHA, DIDP (diisodecyl phthalate, a product of TCI Japan), and Grindsted Soft-N-Safe® (acetylated monoglyceride of castor wax, a product of Danisco). Table 2 sets forth the PVC and plasticizers and their abbreviation and source for each.

TABLE 2

| Abbreviation | Name | Tradename or Source |
| --- | --- | --- |
| PVC | Polyvinyl chloride | OxyVinyls ® 240F |
| ESO | Epoxidized soybean oil | PLAS-CHEK ® 775, a product of Ferro |
| DIDP | Diisodecyl phthalate | TCI Japan |
| S-N-S | Acetylated monoglyceride of castor wax | Grindsted Soft-N-Safe ®, a product of Danisco |

PVC, plasticizer and additives are combined to prepare thermoplastic compositions. The components present in each thermoplastic composition are provided in Table 3 below. The preparation procedure for each thermoplastic composition follows Table 3.

TABLE 3

Composition of Examples 5-7 and Comparative Samples 3-4 (in wt % total composition)

| Component | Ex. 5 and CS 3 | Ex. 6-7 and CS 4 |
| --- | --- | --- |
| PVC | 63.9 | 63.9 |
| Primary Plasticizer | 23.8 (87)* | 23.8 (87)* |
| CaCO$_3$ | 6.4 | — |
| Clay | — | 6.4 |
| Secondary Plasticizer (ESO) | 3.5 (13)* | 3.5 (13)* |
| Mark ® 6797 | 2.1 | 2.1 |
| Irganox ® 1076 | 0.3 | 0.3 |

*= wt % based on total weight of plasticizer
CaCO$_3$ = Hubercarb ® Q1T calcium carbonate
Mark ® 6797 = calcium-zinc stabilizer (Chemtura Corp.)
Clay = Polyfil ® 70 kaolin clay
Irganox ® 1076 = hindered phenolic antioxidant (Ciba Chemicals)
PVC = polyvinyl chloride homopolymer (OxyVinyls ® 240F)

The following procedure is used to prepare the thermoplastic compositions for Examples 5-7 and Comparative Samples 3-4

Weigh the individual ingredients and mix all in a container using a spatula
Use "40 cm$^3$" Brabender mixing bowl with conventional rotors to make batches of each formulation at 40 rpm setting
Do not purge mixing bowl with nitrogen
Add mixture of PVC and other ingredients, and mix at 175° C. for 5 minutes The blend compositions are removed from the mixing bowl and are compression molded at 175° C. for 5 minutes. Specimens are cut from 30 mil thick molded plaques for testing of all properties except volume resistivity. Volume resistivity is measured on specimens cut from 40 mil thick molded plaques. Tensile strength and elongation are measured, at 2 inch/min, on fresh (i.e., unaged) specimens, and on specimens aged for 168 hours at 113° C. or 136° C. Dynamic mechanical analysis is conducted over a range of about −100° C. to +160° C., at a rate of 5° C./min, and the modulus at −20° C. is determined.

2. Properties of Examples 5-7 and Comparative Examples 3-4

Example 5 is prepared with the nominal AMHA plasticizer of Example 1. Examples 6 and 7 are respectively prepared with the nominal AMHA plasticizers of Examples 1 and 2. Comparative Samples 3 and 4 are respectively prepared with DIDP and Grindsted® Soft-N-Safe as plasticizers. The data are provided in Table 4 below.

TABLE 4

Properties of Examples 5-7 and Comparative Samples 3-4

| Primary Plasticizer | DM (Pa) | Shore (A) | $T_g$ (°C.) | TS (un-aged) - psi | TSR (%) after 113° C. Aging | TSR (%) after 136° C. Aging | TE (un-aged) - % | TER (%) after 113° C. Aging | TER (%) after 136° C. Aging | WR (%) after 7 days @ 136° C. | VR (Ohms cm) at 23° C. |
| --- | --- | --- | --- | --- | --- | --- | --- | --- | --- | --- | --- |
| Ex. 5 AMHA of Ex. 1 | 9.82E+08 | 90.7 | 32.5 | 3376 ± 187 | 105 ± 6 | 113 ± 7 | 318 ± 21 | 92 ± 1 | 81 ± 3 | — | 4.63E+11 |
| Ex. 6 AMHA of Ex. 1 | 1.16E+09 | 90.4 | 35.8 | 2304 ± 75 | 116 ± 7 | 121 ± 11 | 132 ± 5 | 71 ± 5 | 37 ± 13 | 92.8 | 4.71E+11 |
| Ex. 7 AMHA of Ex. 2 | 1.02E+09 | 90.5 | 33.1 | 2229 ± 64 | 111 ± 5 | 129 ± 7 | 134 ± 3 | 72 ± 3 | 44 ± 7 | 93.6 | 4.21E+11 |
| CS 3 DIDP | 9.51E+08 | 91.1 | 28.1 | 2947 ± 288 | 114 ± 30 | 171 ± 16 | 243 ± 32 | 97 ± 43 | 18 ± 16 | — | 7.54E+12 |

TABLE 4-continued

Properties of Examples 5-7 and Comparative Samples 3-4

| Primary Plasticizer | DM (Pa) | Shore (A) | $T_g$ (° C.) | TS (un-aged) - psi | TSR (%) after 113° C. Aging | TSR (%) after 136° C. Aging | TE (un-aged) - % | TER (%) after 113° C. Aging | TER (%) after 136° C. Aging | WR (%) after 7 days @ 136° C. | VR (Ohms cm) at 23° C. |
|---|---|---|---|---|---|---|---|---|---|---|---|
| CS 4 S-N-S | 9.71E+08 | 89.3 | 25.7 | 2340 ± 3 | 112 ± 3 | 177 ± 32 | 141 ± 13 | 89 ± 11 | 4 ± 3 | 91.5 | 4.63E+11 |

DM = Dynamic Modulus at −20° C. (Pa)
Shore (A) = Shore A hardness ASTM D2240
TE = Tensile elongation, ASTM D638
TER = Tensile elongation retention, ASTM D638
TER 113° C. = Tensile elongation retention (%), specimen aged at 113° C. for 168 hours
TER 136° C. = Tensile elongation retention (%), specimen aged at 136° C. for 168 hours
$T_g$ = Glass transition temperature (° C.)
TS = Tensile strength, ASTM D638
TSR = Tensile strength retention, ASTM D638
TSR 113° C. = Tensile strength retention, (%), specimen aged at 113° C. for 168 hours
TSR 136° C. = Tensile strength retention, (%), specimen aged at 136° C. for 168 hours
VR = Volume Resistivity (Ohms cm) at 23° C.
WR = Weight Retained (%) after 7 days The presence of triacetin in the compositions of Examples 1-2 lowers the temperature of 5% mass loss compared to CS 1 and CS2. Surprisingly, the plasticizer of examples 5-7 (which contain the compositions of examples 1 and 2) show improved TSR (a lower value is desired), TER (a higher value is desired) and WR (a higher value is desired) when compared to the plasticizers containing DIDP and Grindsted® Soft-N-Safe. This is unexpected as one would expect a plasticizer composition containing triacetin to be more volatile than one without triacetin. It is believed that the absence of castor oil fatty acid glycerides in Examples 1 and 2 contributes to these unexpected results.

Each of Examples 5-7 have better high temperature tensile properties than the plasticizers made with DIDP (CS 3) and Grindsted® Soft-N-Safe (CS 4). The heat aging result is unexpected given the relatively greater volatility of examples 1-2, which contain triacetin. Examples 5-7 have a similar modulus (DM) at −20° C. compared to CS 3 and CS 4, suggesting that Examples 5-7 are flexible at sub-zero temperatures. The weight loss during heat aging at 136° C. of Examples 6-7 compositions is less than that of the comparative sample made with Grindsted Soft-N-Safe®, CS 4.

The following procedure is used to prepare the thermoplastic compositions of Examples 8-9 and Comparative Samples (CS) 5-6.

Blends of polyvinylchloride (PVC), additives and different plasticizers (or a plasticizer mixture) are prepared in Examples 4 to 5 and comparative samples 6 to 7. The thermoplastic compositions contain 60.3 wt % PVC (OxyVinyls® 240F), 30.0 wt % plasticizer or plasticizer mixture, 6.4 wt % calcined clay (Satintone® SP-33), 3.0 wt % calcium-zinc mixed metal heat stabilizer (Baeropan® MC 90249 KA), and 0.3 wt % antioxidant (Irganox® 1076). The plasticizers evaluated are: (a) nominal AMHA of Example 2; (b) Mixture composed of 50 wt % nominal AMHA of Example 2 and 50 wt % PLAS-CHEK® 775 ESO; (c) trioctyl trimellitate (TOTM; product of Sigma-Aldrich) and (d) diisodecyl phthalate (DIDP; product of Univar). The following procedure is used to prepare the blends:

Preheat TOTM, DIDP, AMHA, and epoxidized soybean oil to 60° C. for at least 60 minutes, shake and make a 50/50 wt % AMHA/ESO mixture (plasticizer composition)

Make "solids mixture" by mixing all ingredients (except plasticizer and clay) in a container using a spatula Make 'dry blends' by soaking plasticizer into PVC powder, as follows Use "40 cm$^3$" Brabender mixing bowl with sigma blades at 90° C. to make batches of each formulation at 40 rpm setting Do not purge mixing bowl with nitrogen After 2 min warm-up, add "solids mixture" and mix for 30 seconds Add plasticizer and mix for 6 minutes, and also observe how long it takes for plasticizer absorption to be completed (i.e., the physical appearance of the powder to change from "wet" to "dry")

Add filler (clay) and mix for 60 seconds

Stop and remove "dry blend"

The 'dry blend' is subsequently melt mixed using the following procedure:

(a) Mix in a "40 cm$^3$" Brabender mixing bowl with cam rotors at 40 rpm setting (b) Do not purge mixing bowl with nitrogen (c) Add 'dry blend', and mix at 180° C. for 2 minutes The blend composition is removed from the mixing bowl and is compression molded at 180° C. for 5 minutes. Specimens are cut from 30 mil thick molded plaques for testing of all properties except volume resistivity and Shore hardness. Volume resistivity is measured on specimens cut from 40 mil thick molded plaques. Shore A and Shore D are measured on 250 mil thick molded specimens. The data are provided in Table 5.

The compositions of Examples 8 and 9 exhibit properties that are similar to or better than those obtained with comparative examples 5 and 6. In particular, the composition of Example 9 exhibits superior retention of tensile elongation after heat aging for 7 days at 136° C., comparable to that obtained with TOTM (comparative sample 6), as well as desirably low hardness and fast time for absorption of plasticizer.

TABLE 5

| Plasticizer† Mixture | Time for Complete Absorption of Plasticizer (min) | Hardness (Shore D) | Hardness (Shore A) | TS (Unaged) - psi | TSR (%) after 113° C. Aging | TSR (%) after 136° C. Aging | TE (Unaged) - % | TER (%) after 113° C. Aging | TER (%) after 136° C. Aging | Weight Retained (%) after 7 Days at 136° C. | Spew 136° C. | Vol Res (Ohm cm) at 23° C. |
|---|---|---|---|---|---|---|---|---|---|---|---|---|
| Example 8: AMHA of Ex. 2 (100) | 2.75 | 30.7 ± 0.9 | 87.6.1 ± 0.2 | 3291 ± 227 | 110 ± 4 | 108 ± 10 | 337 ± 29 | 94 ± 8 | 61 ± 15 | 91.6 | None | 5.87E+14 |
| Example 9: AMHA of Ex. 2 (50) ESO (50) | 2.75 | 32.4 ± 0.9 | 87.0 ± 0.5 | 3225 ± 248 | 106 ± 5 | 103 ± 5 | 279 ± 33 | 98 ± 11 | 89 ± 14 | 96.0 | None | 1.97E+15 |
| CS 5 DIDP (100) | 3.25 | 32.6 ± 0.6 | 88.6 ± 0.7 | 3230 ± 44 | 125 ± 7 | 216 ± 21 | 291 ± 14 | 77 ± 3 | 1 ± 30 | 75.8 | None | 1.19E+16 |
| CS 6 TOTM (100) | 5.25 | 34.4 ± 0.8 | 90.1 ± 0.8 | 3481 ± 150 | 102 ± 3 | 112 ± 8 | 301 ± 12 | 99 ± 6 | 92 ± 6 | 97.5 | None | 8.65E+15 |

ESO = Epoxidized soybean oil
Spew 136° C. = Exudate (spew) on surface after 7 days at 136° C.
Shore (A) = Shore A hardness ASTM D2240
TE = Tensile elongation, ASTM D638
TER = Tensile elongation retention, ASTM D638
TER 113° C. = Tensile elongation retention (%), specimen aged at 113° C. for 168 hours
TER 136° C. = Tensile elongation retention (%), specimen aged at 136° C. for 168 hours
TS = Tensile strength, ASTM D638
TSR = Tensile strength retention, ASTM D638
TSR 113° C. = Tensile strength retention (%), specimen aged at 113° C. for 168 hours
TSR 136° C. = Tensile strength retention (%), specimen aged at 136° C. for 168 hours
Vol Res = Volume Resistivity (Ohm cm) @ 23° C.
Wt Ret. = Retained weight (%) after 7 days @ 136° C.
† = Weight percent for plasticizer components is shown in parenthesis.
Weight percent is based on total weight of the plasticizer It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A coated conductor comprising:
   a conductor; and
   a coating on the metal conductor, the coating comprising a phthalate-free polymeric composition comprising
   (A) a single polymeric resin consisting of a polyvinyl chloride and
   (B) a plasticizer composition comprising
      (i) from 30 wt % to 99 wt % of a castor-free primary plasticizer comprising acetylated monoglyceride of 12-hydroxystearic acid (AMHA), acetylated diglyceride of 12-hydroxystearic acid (ATHA), acetylated triglyceride of 12-hydroxystearic acid (ATHA), triacetin, and glycerol, the primary plasticizer having a hydroxyl number from 0 to less than 15 as measured in accordance with DIN 53240 and a temperature of 5% mass loss from 150° C. to 190° C. determined using TG/DTA 220; and
      (ii) from 70 wt % to 1 wt % of a second plasticizer based on total weight of the plasticizer composition comprising an epoxidized fatty acid ester;
   wherein the polymeric composition has a tensile elongation retention greater than 20% after 168 hours heat aging at 136° C. as measured on dog bones cut from 30 mil thick plaques in accordance with ASTM D638.

2. The coated conductor of claim 1, wherein the primary plasticizer comprises from 0.5 wt % to 30 wt % triacetin.

3. The coated conductor of claim 1, wherein the epoxidized fatty acid ester is selected from the group consisting of epoxidized natural seed oil, epoxidized propylene glycol dioleate, epoxidized fatty acid methyl esters, epoxidized derivatives of each of the foregoing, and combinations thereof.

4. The coated conductor of claim 3, wherein the epoxidized fatty acid ester is epoxidized soybean oil.

5. The coated conductor of claim 1, wherein the plasticizer composition comprises greater than 50 wt % AMHA.

6. The coated conductor of claim 1 wherein the plasticizer composition is void of glyceride having a fatty acid selected from the group consisting of ricinoleic acid, oleic acid, linoleic acid, linolenic acid, stearic acid, palmitic acid, eicosanoic acid, gadoleic acid, arachidic acid, and combinations thereof.

7. The coated conductor of claim 1, wherein the polymeric composition has a tensile strength retention from 70% to 150% after 168 hours heat aging at 136° C. as measured on dog bones cut from 30 mil thick plaques in accordance with ASTM D638.

8. The coated conductor of claim 1, wherein the primary plasticizer has a hydroxyl number of 0 as measured in accordance with DIN 53240.

9. The coated conductor of claim 1, wherein the plasticizer composition comprises 50 wt % of the primary plasticizer and 50 wt % of the epoxidized fatty acid ester.

10. The coated conductor of claim 1, wherein the plasticizer composition comprises 87 wt % of the primary plasticizer and 13 wt % of the epoxidized fatty acid ester.

11. The coated conductor of claim 1, wherein the polymeric composition further comprises a filler, an antioxidant, and a heat stabilizer.

12. The coated conductor of claim 11, wherein the polymeric composition comprises from 0.01 wt % to 5 wt % antioxidant and from 0.1 wt % to 10 wt % heat stabilizer, based on the total weight of the polymeric composition.

13. The coated conductor of claim 1, wherein the coating has a thickness from 0.010 inches to 0.200 inches.

14. The coated conductor of claim 1 wherein the primary plasticizer comprises tin octanoate.

15. A coated conductor comprising:
a conductor; and
a coating on the metal conductor, the coating comprising a phthalate-free polymeric composition comprising
(A) from 40 wt % to 80 wt % of a single polymeric resin consisting of a polyvinyl chloride; and
(B) from 60 wt % to 20 wt % of a castor-free plasticizer composition comprising
(i) from 30 wt % to 99 wt %, based on total weight of the plasticizer composition, of a primary plasticizer comprising acetylated monoglyceride of 12-hydroxystearic acid (AMHA), acetylated diglyceride of 12-hydroxystearic acid (ADHA), acetylated triglyceride of 12-hydroxystearic acid (AMTA), triacetin, and glycerol, the primary plasticizer having a hydroxyl number of 0 as measured in accordance with DIN 53240 and a temperature of 5% mass loss from 150° C. to 190° C. determined using TG/DTA 220; and
(ii) from 70 wt % to 1 wt % of a second plasticizer, based on total weight of the plasticizer composition, consisting of epoxidized soybean oil;
wherein the polymeric composition has a tensile elongation retention greater than 40% after 168 hours heat aging at 136° C. as measured on dog bones cut from 30 mil thick plaques in accordance with ASTM D638.

16. The coated conductor of claim 15 wherein the primary plasticizer consists of acetylated monoglyceride of 12-hydroxystearic acid (AMHA), acetylated diglyceride of 12-hydroxystearic acid (ADHA), acetylated triglyceride of 12-hydroxystearic acid (AMTA), triacetin, and glycerol.

17. The coated conductor of claim 16 wherein the plasticizer composition comprises a filler.

18. The coated conductor of claim 17 wherein the coating exhibits no spew after 7 days at 136° C.

19. The coated conductor of claim 15 wherein the primary plasticizer comprises tin octanoate.

* * * * *